(12) United States Patent
Westerlund et al.

(10) Patent No.: US 8,225,164 B2
(45) Date of Patent: Jul. 17, 2012

(54) MEDIA CONTAINER FILE MANAGEMENT

(75) Inventors: Magnus Westerlund, Kista (SE); Per Fröjdh, Stockholm (SE); Thorsten Lohmar, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 903 days.

(21) Appl. No.: 12/160,155

(22) PCT Filed: Jan. 4, 2007

(86) PCT No.: PCT/SE2007/000005
§ 371 (c)(1),
(2), (4) Date: Jul. 7, 2008

(87) PCT Pub. No.: WO2007/078253
PCT Pub. Date: Jul. 12, 2007

(65) Prior Publication Data
US 2010/0023525 A1    Jan. 28, 2010

Related U.S. Application Data

(60) Provisional application No. 60/743,095, filed on Jan. 5, 2006.

(51) Int. Cl.
*G06F 11/00* (2006.01)
(52) U.S. Cl. .................. 714/752; 714/776; 714/781
(58) Field of Classification Search .................. 714/752, 714/776, 781
See application file for complete search history.

(56) References Cited

U.S. PATENT DOCUMENTS

| | | | |
|---|---|---|---|
| 6,516,435 B1 | 2/2003 | Tsunoda | |
| 6,732,314 B1* | 5/2004 | Borella et al. | 714/752 |
| 6,850,519 B1* | 2/2005 | Saito et al. | 370/389 |
| 7,810,007 B2* | 10/2010 | Herrmann | 714/746 |
| 7,940,777 B2* | 5/2011 | Asati et al. | 370/395.52 |
| 2002/0194570 A1* | 12/2002 | Birru et al. | 714/792 |
| 2003/0031119 A1* | 2/2003 | Kim et al. | 370/200 |
| 2003/0053454 A1* | 3/2003 | Katsavounidis et al. | 370/389 |
| 2005/0102371 A1* | 5/2005 | Aksu | 709/217 |
| 2006/0291475 A1* | 12/2006 | Cohen | 370/395.42 |
| 2007/0002852 A1* | 1/2007 | Pekonen et al. | 370/389 |
| 2007/0177719 A1 | 8/2007 | Dei et al. | |
| 2009/0177942 A1* | 7/2009 | Hannuksela et al. | 714/752 |

(Continued)

FOREIGN PATENT DOCUMENTS

GB       2406483 A    3/2005

(Continued)

OTHER PUBLICATIONS

Toiminen, J. et al. VM to Amendment 2 to 14496-12:2005 ($2^{nd}$ Editon) FLUTE Hint Tracks in ISO Base Media File Format, ISO/IC JTC1/SC29/WG11 MPEG/N7583. Oct. 2005.

(Continued)

*Primary Examiner* — Marc Duncan

(57) ABSTRACT

The invention teaches a media container file comprising media data organized into media source blocks. Forward error correction (FEC) redundancy data is pre-calculated for the different source blocks and organized into the container file as different FEC reservoirs. The container file also comprises meta data providing an association between the media source blocks and the respective FEC reservoirs. The container file can be employed by a media server in a media session for compiling media data packets to be transmitted to requesting clients without the need of extensive data processing and FEC calculation.

34 Claims, 10 Drawing Sheets

U.S. PATENT DOCUMENTS

2009/0201805 A1\* 8/2009 Begen et al. .................. 370/225
2009/0313293 A1\* 12/2009 Setlur et al. ................... 707/102

FOREIGN PATENT DOCUMENTS

| | | |
|---|---|---|
| JP | 2000-267699 A | 9/2000 |
| JP | 2001-086153 A | 3/2001 |
| WO | WO 2004/036760 A1 | 4/2004 |

OTHER PUBLICATIONS

Digital Fountain. Raptor Code Specification for MBMS File Download, 3GPP SA4 PSM Ad-Hoc #31 S4-040230 May 2004.

\* cited by examiner

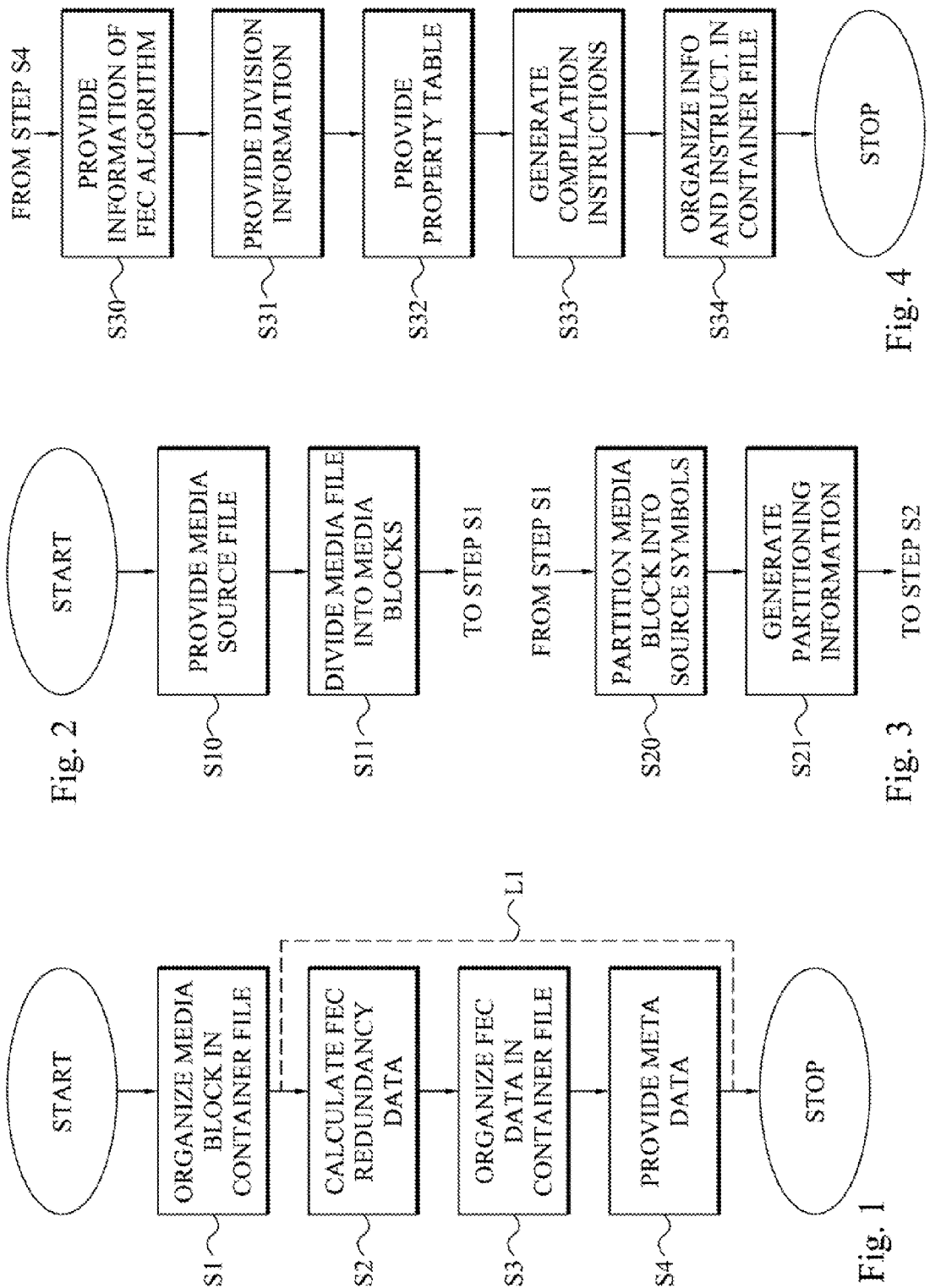

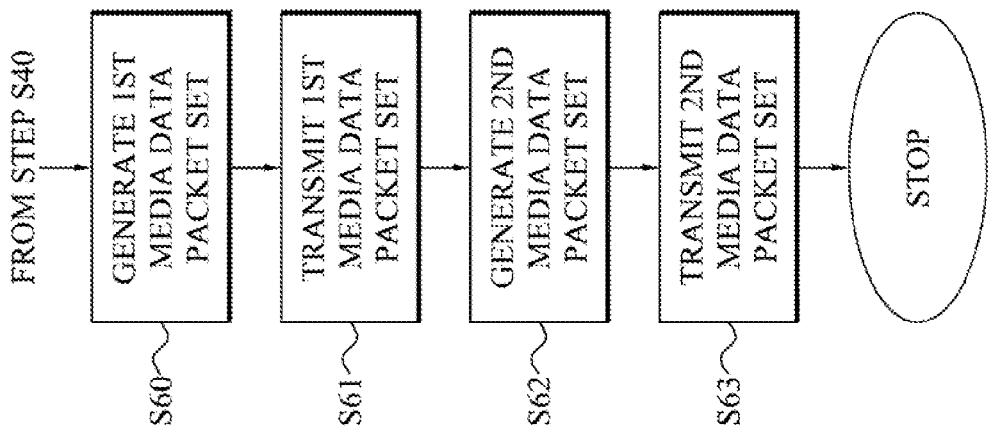
Fig. 7
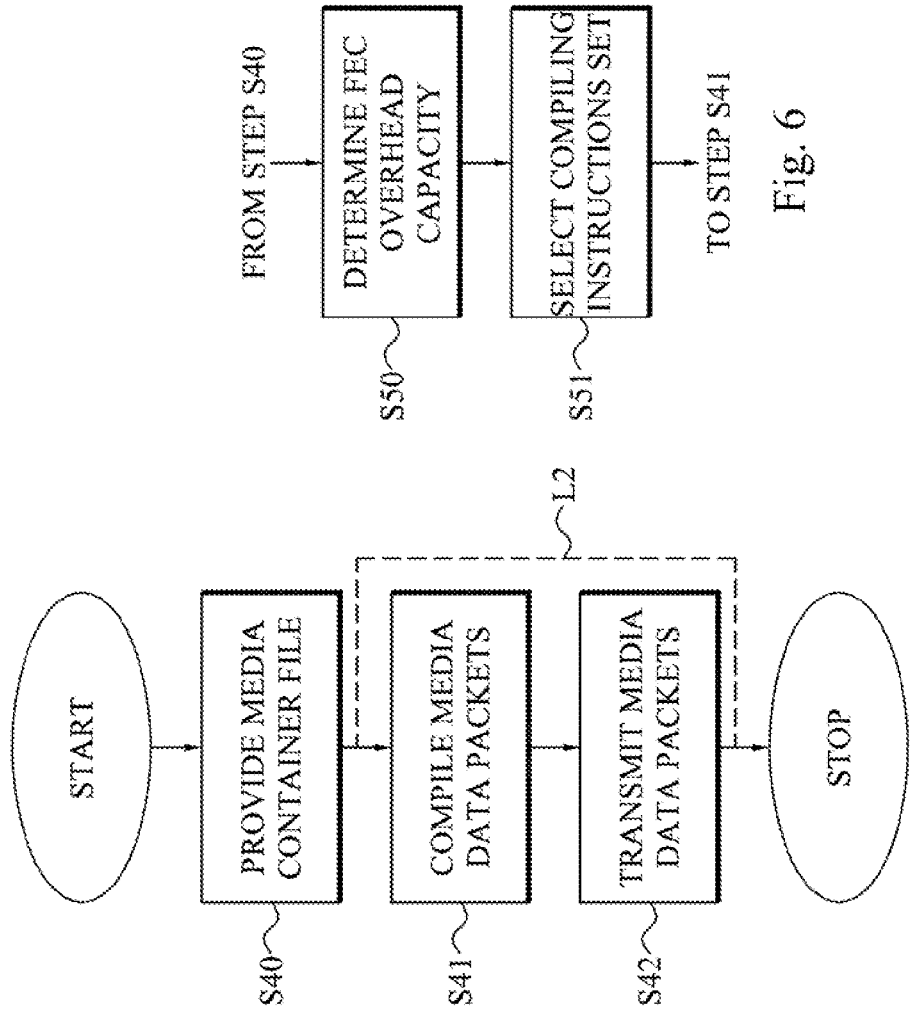
Fig. 6
Fig. 5

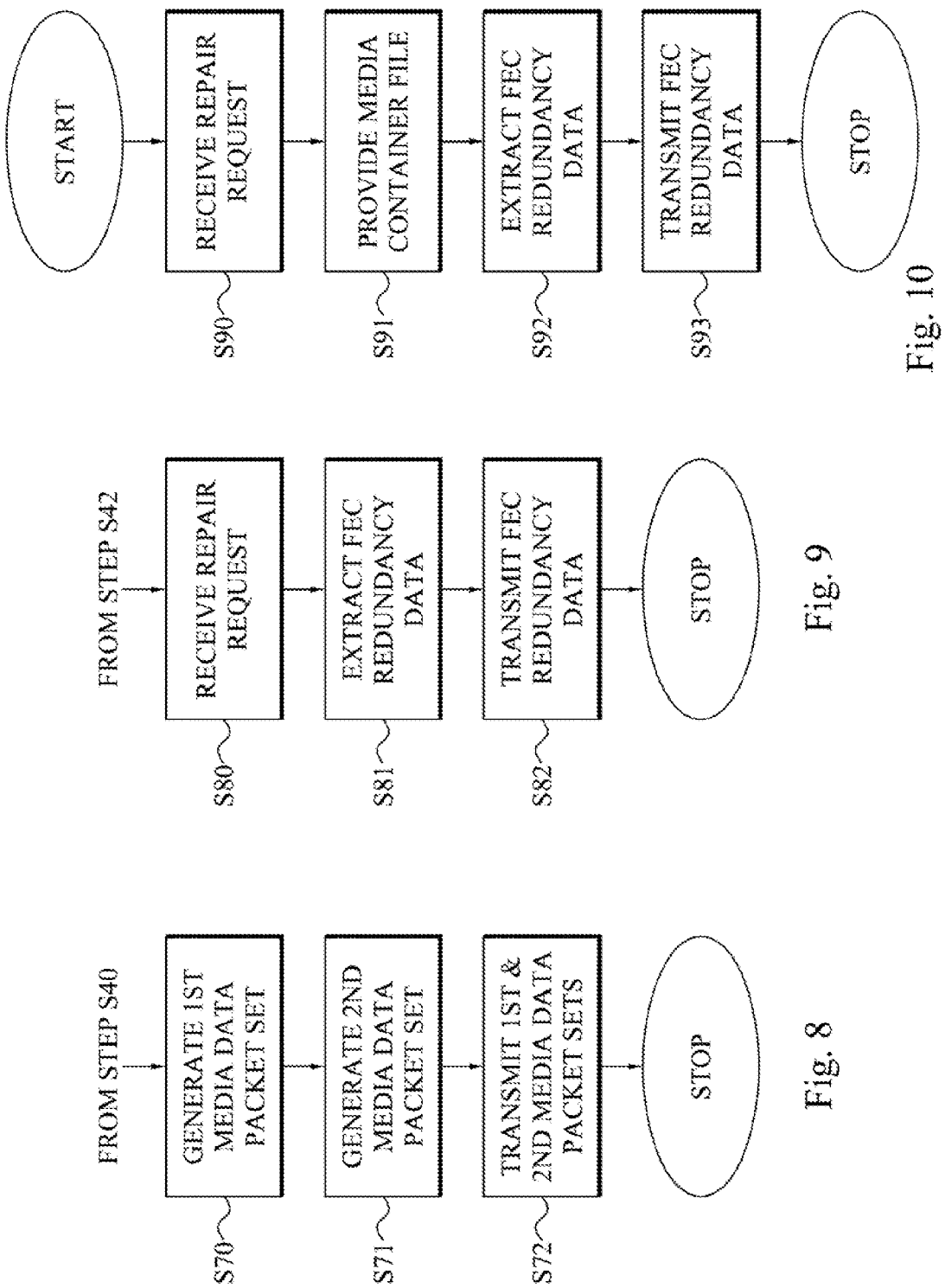

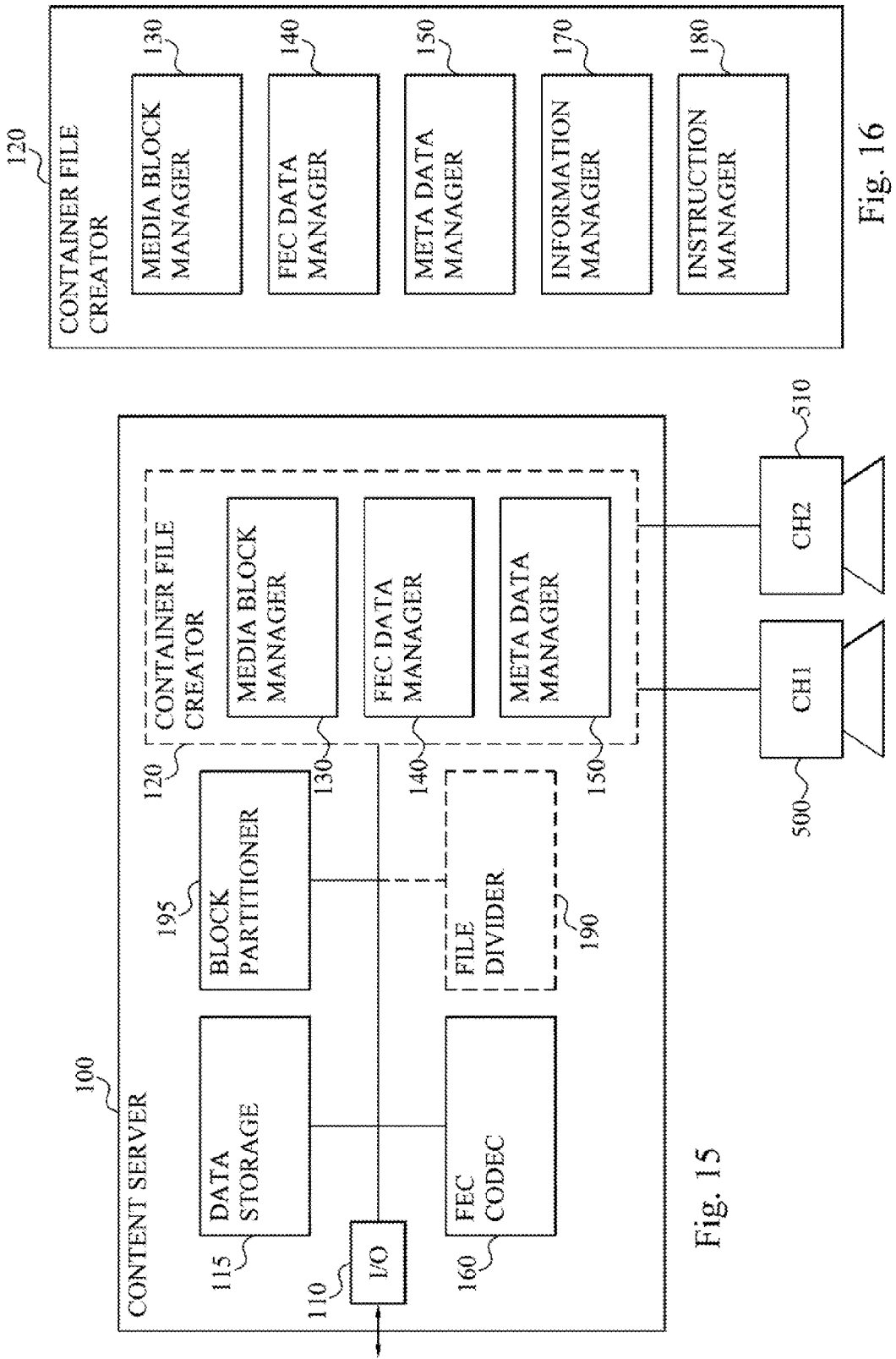

MEDIA CONTAINER FILE MANAGEMENT

This application claims the benefit of US Provisional Application No. 60/743095, filed Jan. 5, 2006, the disclosure of which is fully incorporated herein by reference.

TECHNICAL FIELD

The present invention generally relates to media and multimedia management, and in particular to creation and usage of media container files containing such media and multimedia content.

BACKGROUND

Media and multimedia provision to client over different networks have increased tremendously the last few years. Today, Internet is employed by numerous users for accessing and downloading media, e.g. in the form of video and audio streams or files, from media servers. This media provision has also emerged in radio-based mobile communications networks. There is currently a very big interest in using mobile networks for multimedia or TV content. This is often referred to as Mobile-TV in the art. This media provision in the mobile networks is today mainly available through unicast transport. However, at the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H).

In line with this increasing demand for media provision in different wired and wireless communications networks, there is on-going work in the development of streaming and downloading servers available in wireless networks for providing media content to requesting clients. There is a general trend towards transparent and flexible streaming/downloading servers, implying that the servers should basically consist of a multitude of "standard" modules or programmes performing different media managing functions. The input media content to these functions is then provided together with instructions of how the modules/programmes should process the content. This will provide a more flexible media provision as compared to usage of fixed, pre-defined media processing in the servers.

Together with the development of flexible streaming/downloading servers, development is taking place in the area of how error correction can be introduced in the media streams. The multicast/broadcast transmissions are unidirectional and addressing a high number of receiving clients simultaneously. Traditional unicast reliability schemes, such as Automatic Repeat Request (ARQ), are not scalable to serve the high number of receivers of multicast/broadcast transmissions.

Thus, there is a need for introduction of a reliability scheme in connection with multicast/broadcast media transmission. The introduction of such a reliability scheme should also be in the line with trend of flexible streaming and downloading server solutions.

SUMMARY

The present invention overcomes these and other drawbacks of the prior art arrangements.

It is a general object of the present invention to provide a media container file that can be used in multimedia sessions.

It is another object of the invention to provide a media container file that also can be used in post-session repair procedures.

These and other objects are met by the invention as defined by the accompanying patent claims.

Briefly, the present invention involves generation and usage of a media container file and to devices for generating and using such a container file.

The generation of a media container file involves providing at least one media source file comprising media or multimedia data to be transmitted to requesting clients and rendered at the clients. This container file is regarded as consisting of one or more media source blocks, depending on the size of the source file. At least one such media source block is processed according to the present invention for the purpose of calculating FEC redundancy data or symbols based on the source block. Thus, media data of the source block is input to a FEC algorithm for the calculation of at least one FEC symbol. This FEC symbol calculation is preferably performed for each media source block of a source file. The at least one media source block is then organized into the media container file. Correspondingly, the calculated FEC data is also organized in the media container file into one or more FEC reservoirs. Each such FEC reservoir comprises the FEC data calculated for a particular media source block. Meta data is provided and included in the container file for providing an association between a media source block and its FEC reservoir.

The resulting container file can be employed by a media server during a media session for compiling, using the meta data in the container file, data packets comprising media data and FEC data. The pre-calculation of FEC data and organization of media and FEC data in the container file of the invention allows the media server, in a simple computationally inexpensive manner, to insert media data and FEC data in data packets transmitted to requesting clients without extensive data processing and computationally demanding FEC calculation.

In a preferred embodiment, the container file also comprises compiling instructions that are used and followed by the media server when compiling data packets containing media and FEC data from the container file. In such a case, the container file comprises all the media content, protection data and instructions required for successfully being able to forward the media data in a reliable manner to the clients.

The container file of the invention can also be used in post-session repair procedures, where, in despite of the inclusion of FEC redundancy protection into the transmitted data packets, a client was not able to successfully receive all media data during a media session. In such a case, a copy of the same container file that was used during the previous media session is used by a repair server. The server is able to retrieve FEC redundancy data from one of the FEC reservoirs in the container file based on the request from the client. This FEC data is then returned to the client, allowing it to successfully render all media data.

SHORT DESCRIPTION OF THE DRAWINGS

The invention together with further objects and advantages thereof, may best be understood by making reference to the following description taken together with the accompanying drawings, in which:

FIG. 1 is a flow diagram illustrating a method of generating a media container file according to an aspect of the present invention;

FIG. 2 is a flow diagram illustrating additional steps of the file generating method of FIG. 1;

FIG. 3 is a flow diagram illustrating additional steps of the file generating method of FIG. 1;

FIG. 4 is a flow diagram illustrating additional steps of the file generating method of FIG. 1;

FIG. 5 is a flow diagram illustrating a media session managing method according to another aspect of the present invention;

FIG. 6 is a flow diagram illustrating additional steps of the session managing method of FIG. 5;

FIG. 7 is a flow diagram illustrating an embodiment of the compiling and transmitting steps of FIG. 5 in more detail;

FIG. 8 is a flow diagram illustrating another embodiment of the compiling and transmitting steps of FIG. 5 in more detail;

FIG. 9 is a flow diagram illustrating additional steps of the session managing method of FIG. 5;

FIG. 10 is a flow diagram illustrating a post-session repair method according to a further aspect of the present invention;

FIG. 15 is a schematic block diagram of a content server according to yet another aspect of the present invention;

FIG. 16 is a schematic block diagram illustrating an embodiment of the container file creator of FIG. 15 in more detail;

DETAILED DESCRIPTION

Figure 11:
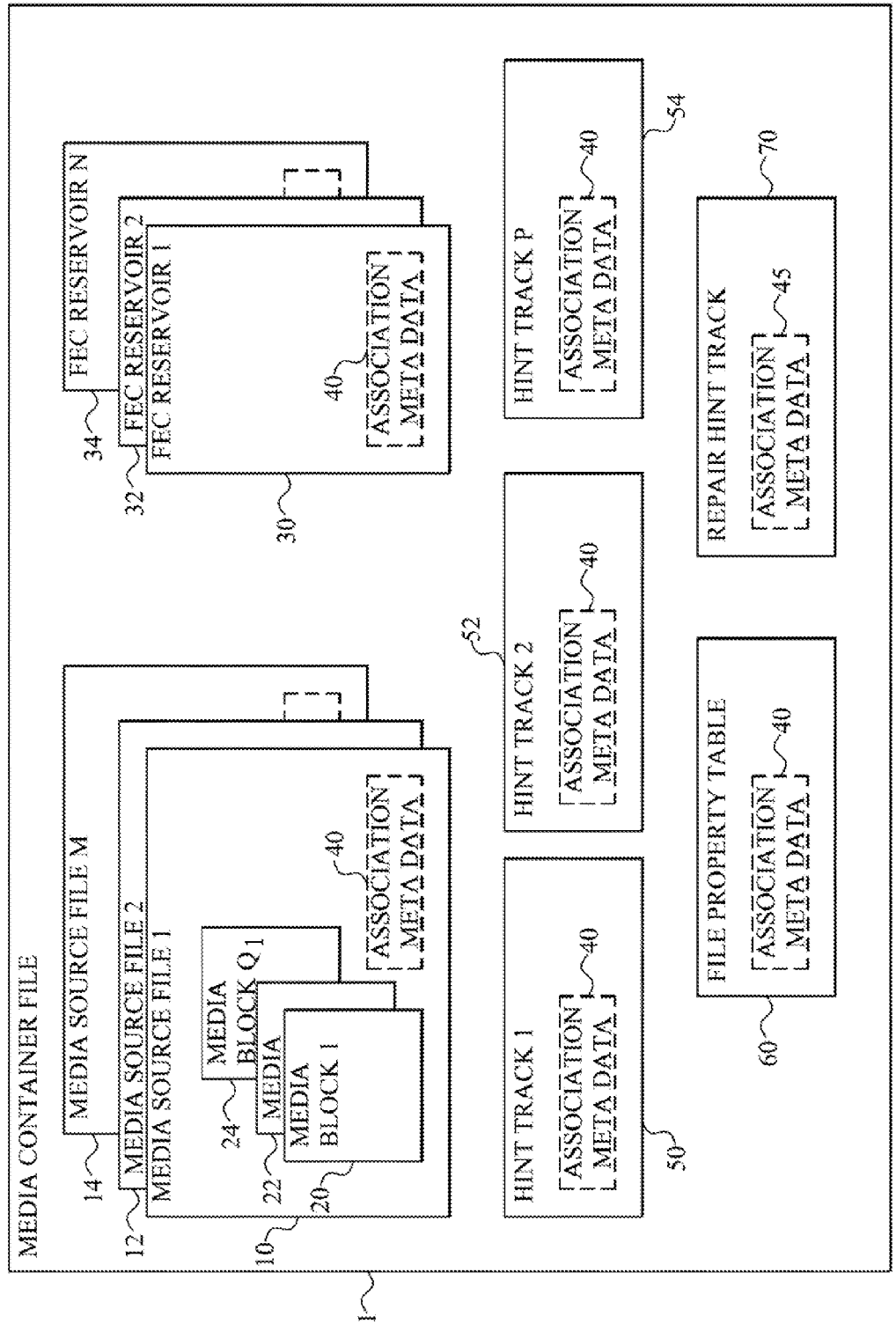
FIG. 11 is a schematic overview of a media container file according to still another aspect of the present invention.

Throughout the drawings, the same reference characters will be used for corresponding or similar elements.

The present invention generally relates to media and multimedia data management and in particular to creation and utilization of container files in connection with media servers, such as streaming or downloading servers, in a radio-based communications network. These media container files of the invention comprises, in addition to the media content to transmit to requesting client(s) and the instructions used for performing media processing and transmission in the media servers, data that provides reliability protection to the media session. This reliability protection is achievable due to the presence of pre-generated forward error correction (FEC) redundancy data included in the container file.

As is known in the art, FEC involves adding redundant data to transmitted payload data, which allows a receiver to detect and correct errors without the need to ask the sender for additional data. The advantage of FEC is that retransmission of data can often be avoided, though at the cost of higher bandwidth requirements on average. Thus, FEC can advantageously be used in connection with multicast/broadcast-based delivery of media content, where retransmissions will be hard to implement.

FEC is accomplished by adding redundancy to the information to be transmitted using a predetermined algorithm or scheme, typically denoted FEC codec in the art. Each such redundant bit is invariably a complex function of many original information or payload bits. A FEC codec that includes the unmodified input in the output is denoted a systematic codec. In other words an (N, K) systematic FEC codec preserves the K source or payload symbols and appends (N-K) FEC symbols. Correspondingly, an (N, K) non-systematic FEC codec creates N (FEC or source) symbols from K source symbols without necessarily preserving all of them.

There are two main categories of FEC codecs: block codes and convolutional codes. FEC block codecs work on fixed-size blocks (packets) of bits or symbols of predetermined size, whereas convolutional codecs work on bit or symbol streams of arbitrary length. Digital Fountains Raptor codec is FEC block codec that is capable of creating an arbitrary number of FEC redundancy symbols out of a single source block. This is an advantageous property of this FEC codec since different protection-overhead configurations can be generated without any change in the source block construction. Reed-Solomon is another FEC block codec that, however, requires a change in the source block partitioning for different protection overhead sizes. Other examples of FEC block codecs include Golay, BCH (Bose, Ray-Chaudhuri, Hocquenghem) and Hamming. A preferred FEC codec to use in connection with the present invention is the Digital Raptor codec.

According to the current invention, media or multimedia data or content refers to any data that can be provided by a content provider or server to a client for rendering of the data. Typical preferred examples include video data and audio data. The data can be in the form of a pre-encoded, fixed rate audio or video content version or in the form of a scalable audio or video content. Other media examples include still images (JPEG), bit map graphics (GIF and PNG), vector graphics (SVG), and synthetic audio (SP-MIDI) and text (XHTML and SMIL).

FIG. 1 is a flow diagram of a method of generating a media container file according to the present invention. This media container file can be regarded as a complete input package that is used by a media server during a media session for providing media content and forming media data into transmittable data packets. Thus, the container file preferably comprises, in addition to the media content per se, information and instructions required by the media server for performing the processing and allowing transmission of the media content during a media session.

The method starts in step S1 where at least one media source block is organized and stored in the container file. If more than two media source blocks are present in the container file, they may be regarded as separate media blocks of a same media content file or stream, e.g. a video stream, and/or of different media files or streams, e.g. a few media source blocks of an video stream and a few media blocks of a corresponding associated audio stream. The at least one media source block comprises the media data or symbols that are intended to be sent to a client, where they are rendered for presenting media content to a user. The media blocks may be of a fixed, same size or at least a portion thereof, if more than one, may be of different bit/symbol sizes.

The at least one media block organized in the container file in step S1 preferably collectively comprise all media content data that is to be transmitted to a client during a media session. In other words, the container file contains the media data for an entire multimedia presentation. Thus, if the media content includes a music video, the container file preferably comprises media source blocks with the video data and media blocks with the corresponding audio data. However it is anticipated by the present invention that one and the same media content may provided in multiple potential media versions. For example, the video part of the music video can be provided in multiple pre-encoded video versions, where each such video version is adapted for usage in connection with a given bandwidth or bit rate level or interval. There may therefore be multiple versions of a given media content in the container file. In such a case, each such media version can be regarded as consisting of one or more media source blocks. Though multiple media versions may be available in the container file, typically only one such version is used at a given time during the media session, though there may be a switch between the media versions during the session based on, for example, changes in available bandwidth levels.

In order to provide reliability protection to the media content in the container file, a next step S2 pre-calculates FEC redundancy data based on at least one media source block of the media blocks organized into the container file in step S1. In this calculation step S2, a FEC block codec, such as digital fountain raptor codec, is preferably employed that operate on media block basis. However, a convolutional FEC codec could also be employed and is within the scope of the present invention. In a preferred implementation, a set of FEC redundancy symbols are generated for the at least one media source block. This FEC symbol set could include one but preferably multiple FEC symbols calculated based on the source symbols of the media source block. The number of FEC symbols to calculate for a media source block could be defined by limitations in the FEC codec employed, be a function of the number of media source symbols in the media source block or limited by some other criteria, e.g. size limitations of the container file. The general idea of these pre-calculated FEC redundancy symbols is to provide, in the container file, a reservoir of FEC symbols that are available and can be used by a media server during a media session for providing reliability protection into the media session. The number of FEC symbols per media source block is therefore preferably determined based on this criterion, i.e. being able to provide reliability protection.

In addition to being useful during a media session for providing reliability protection, the FEC redundancy symbols calculated in step S2 can also be used in post-session repair procedure or session. Alternatively, a dedicated sub-set of the FEC redundancy symbols are available during the media session for reliability protection and another sub-set of the redundancy symbols is dedicated for post-session repair, which is described in more detail herein. The present invention therefore has the advantage that a same container file (or copy thereof can be used both by a media server during a media session and by a repair server during a repair session. This allows for a high flexibility in connection with media management. For more information of FEC codecs, reference is made to Annex B of the document [1], the teachings of that Annex B is hereby incorporated by reference.

A next step S3 organizes the FEC redundancy data calculated in step S2 in the container file together with the media source block. This step S3 preferably stores the FEC redundancy symbols of the media source block as a reservoir in the container file. If FEC redundancy symbols have been generated for both reliability protection and post-repair purposes, these symbols can be provided in the same FEC reservoir. Alternatively, a first reservoir houses FEC symbols for reliability purposes and a second reservoir contains post-repair FEC symbols.

The next step S4 provides meta data to be included in the container file. This meta data provides an association between the media source block added to the container file in step S1 and the FEC redundancy data stored in the file in step S3. This association can be in the form of a pointer from the storage location of the media source block within the file and to the storage location of the FEC reservoir, or vice versa. This meta data therefore enables, given the particular media source block or its location within the container file, identification of the associated FEC redundancy data calculated based on the media source block or the storage location of this redundancy data within the file. Instead of employing a pointer, the meta data can include an identifier of the media source block and/or the associated FEC reservoir, in the case these are stored on pre-defined, "standard" locations in the container file. The meta data is then used to identify one of the media source block and the FEC reservoir in the file and based on this identified location the other of the media source block an the FEC reservoir can be identified.

In the case of at least two FEC reservoirs per media source block (for both in-session and post-session usage), the meta data preferably comprises information providing an association between the media source block and both FEC reservoirs. This can be realized by, for example, including in-session meta data and post-session meta data, respectively, in the container file for the media source block.

In a typical implementation of the invention, multiple media source blocks are organized into the container file in step S1. In such a case, the steps S2 to S4 are preferably repeated for each such media source block or at least for multiple groups of media source blocks, which is schematically illustrated by the line L1. Thus, if N media source blocks are organized into the container file in step S1, the steps S2 to S4 are preferably repeated N times, implying also organizing at least N FEC reservoirs and N meta data versions in the container file besides the source blocks.

It is anticipated by the invention that the generated media container file may contain all the media data and FEC data required for a full media session. However, the media data and FEC data may actually be applicable in multiple different sessions. For example, the container file could include media data of a music video, of a football match, etc. In such a case, a media server does not necessarily have to transmit all media data contained in the FEC reservoir but only the particular data requested by the clients. However, another media server might have received a copy of the same container file and instead provides other media data in the file to its clients.

The method then ends.

The container file generation described above in connection with FIG. 1 is preferably conducted at a content creator or server having access to internal or external media content sources. The generated container file may then be represented in a storage medium such as a computer memory, or in a physical signal such as an electrical signal or a radio signal, e.g. for transfer within a local system or for transmission over a local or global network. In a typical embodiment, the container file is provided as a radio signal to a media server for usage in a media session with different clients. Alternatively, or in addition, the container file can be provided to a repair server that can be accessed by clients following a media session with the media server for post-session repair of the received media content, if necessary.

In the following, the term media container file will be used throughout the disclosure with a meaning including both data files for storage in a storage medium and signals for transfer or distribution.

FIG. 2 is a flow diagram illustrating additional steps of the container file generating method of FIG. 1. The method starts in step S10 where at least one media source file is provided. In this illustrative embodiment, media content is available at the container file creator in the form of source files or streams containing the media data. In this step S10, one or more media source files can be provided for inclusion into a container file. For example, a first media file can contain video data, whereas a second associated file contains audio data. In order to enable efficient calculation of FEC redundancy data and, subsequently, usage of such FEC data, the media source file(s) provided in step S10 is divided into a number of media blocks in a next step S11. This media source block can then be regarded as a segment of the media source file, to which a FEC code can be applied. The size of the media blocks in terms of source symbols or data bits can be pre-defined or selected in connection with the division. In the former case, the size could be defined by the intended FEC scheme or code to be employed for calculation of FEC redundancy data. Thus, the actual FEC codec or algorithm and/or required FEC protection overhead could affect the media file division and the media block sizes.

In the case the input media source file has a bit or symbol size that is smaller than the maximum size that can be effectively handled by a FEC codec, no division of that source file into media source blocks is of cause required and step S11 can be omitted. The input media source file is then regarded as a media source block according to the invention.

It is to be noted that even though there is a preferred block size, not all media source blocks generated from a media source file need to be of that preferred size. For example, the last media source block might be of a smaller size as compared to the other equisized blocks since the remaining portion of the media file does not contain enough media data to reach the preferred block size.

This dividing step S11 does not necessarily imply that the media source file is physically divided into separate media source blocks that are stored at separate locations in the container file. In clear contrast, in most practical implementations, the media source file is stored as one continuous data sequence in the container file but is regarded as or virtually divided into media source blocks. For example, a media source file containing 2N source symbols can be divided so that source symbol [0, N−1] belongs to the first source block and symbol [N, 2N−1] belong to the second source block.

The method then continues to step S1 of FIG. 1, where the media source block(s) is (are) organized into the container file.

FIG. 3 is a flow diagram illustrating additional steps of the container file generating method of FIG. 1. The method starts in step S20 where a media source block is partitioned into source symbols or so-called chunks. These symbols generally consist of a number of hundred bytes. This block partitioning is preferably performed at least partly based on information of the FEC codec/algorithm to be used for calculating FEC symbols for the current media source block. As was mentioned in the foregoing, Reed-Solomon based FEC codes requires a change in the source block partitioning based on the desired protection overhead size, i.e. the number of FEC redundancy symbol.

Thus, the actual FEC codec or algorithm and/or required FEC protection overhead could affect the media source partitioning and the media symbol sizes. Also other parameters such as the size of data packets, such as User Datagram Protocol (UDP) packets, used by a media server for transmitting the media content can be used in this source block partitioning of step S20.

In such a case, the size of the source symbols could be limited so at least one complete source symbol can be fit into a UDP packet.

This partitioning step S20 does not necessarily imply that the media source block is physically divided into separate source symbols that are stored at separate locations in the container file. In clear contrast, in most practical implementations, the media source file is stored as one continuous data sequence in the container file but is regarded as or virtually divided into media source blocks, in turn virtually partitioned into source symbols.

In a next step S21, information of the partitioning is generated. This information basically specifies which portions of the data sequence that belongs to which source symbol of the media source block. The partitioning information may be organized into a table specifying that bit X to bit Y of media source block Z constitute a source symbol. Alternatively, the information can include the size in bytes of each source symbol. Then, knowing the start location of a media source block in a media file, it is possible to determine which data portions that belong to the different source symbols.

The method then continues to step S2, where the partitioning symbol is used together with the media source block for calculating the FEC data. Thus, the partitioning information allows identification of the data portions of a media source block that should be input to the FEC codec for generation of a FEC symbol.

As was mentioned in the foregoing, an objective of the present invention is to provide a media container file that, in addition to the actual media data, also includes reliability protection (pre-calculated FEC data). This means that the file-to-source-block division, block partitioning and FEC protection computation are done "off-line" and independent from the actual media transmission process in a media server. This pre-processing simplifies the tasks of the server and reduces the performance requirements and complexity of the server. In addition, the container file preferably also comprises information and instructions required by a media server for identifying and composing media data and FEC data into a media stream that can be transmitted to requesting clients. The container file further preferably also comprises information and instructions required by a repair server to identify and compose FEC data useful in post-repair proceedings following the completion of a media session. Thus, the container file can therefore be regarded as a complete package of data, information and instruction that can be used by transparent and flexible servers for data compilation and transmission.

FIG. 4 is a flow diagram illustrating additional steps of the container file generating method of FIG. 1. The method continues from step S4 of FIG. 1. In a next step S30, information of the FEC algorithm of scheme employed for the calculation of FEC redundancy data is provided. This information can be in the form of the name of the particular algorithm or some other descriptive information. In an alternative approach, each available FEC algorithm has a pre-defined identifier. Thus, only this FEC identifier may then be provided in step S30. In a typical implementation a same FEC codec has been employed for determining redundancy data for all media source blocks of a media source file. However, it might actually be possible to use different FEC codecs for different media source blocks of a given media source file or for media source blocks of different source files. The FEC information could therefore specify that all blocks in the container file have been processed to generate FEC symbols with a single FEC codec or identify which source block or group of source blocks for which different FEC codecs have been used.

In a next step S31, information of the particular media source file division is provided. This information can be of relevance for the media server or repair server, when they are to provide media data packet streams or FEC data to requesting clients.

In a next step S32, a property table is preferably provided. This property table is in particular useful if more than one media source file/stream is included in the container file but can advantageously be used also when only containing a single media source file. The file property table typically contains information of the media type of the media source files, preferably the Multipurpose Internet Mail Extensions (MIME) type of the media. Thus, this MIME information could specify that the media is audio media, video media or some other media type, including Synchronized Multimedia Integration Language (SMIL). This MIME type provides information to the media server of what type of data that is actually included in the container file. The property table can also include information of any coding scheme employed to the media data, including gzip. Also size information can be included in the property table. This size information could state the total size of each media source file in terms of number of bytes or symbols, the respective sizes of the media source blocks of the source file(s) (basically corresponding to the division information provided in step S31), maximum or target payload size for data packets to be used when transmitting data, the size (in bytes) of a media source symbol (basically corresponding to the partitioning information generated in step S21 of FIG. 3) and/or FEC symbol, etc. A file name or file identifier is preferably included in the property table for each media source file included in the container file.

Information of the actual storage location of each media source file in the container file is preferably found in the property table. This location information could specify the start position of the first media source block of that source file and then the remaining media blocks are found subsequent to this position in the container file. The meta data generated in step S4 of FIG. 1 and providing an associated between media source blocks and FEC reservoirs in the container file can also be included in the property table. Correspondingly, the information of the employed block partitioning and the FEC code employed for FEC redundancy data calculation is preferably included in the table.

The property table of the container file could therefore be used as a single information source for a media source to locate a relevant media source file/block, provide FEC redundancy data for that source block and other information useful in compilation of media packets during a media session.

A next step S33 generates compilation instructions for usage by a media server. These instructions are used for defining compilation, based on the meta data providing the FEC-block association, of media data from the media source blocks and FEC redundancy data from the associated FEC reservoir(s) to form a media stream of data packets. Thus, these instructions could be regarded as hints or meta data that provides instructions of how to use the (media and FEC) data included in the container file for composing a transmittable media packet stream having reliability protection. These instructions are therefore used together with the association meta data to compile media data and FEC data together into suitable packets for transmission to requesting clients during a media session. The instructions will therefore describe the server-side transmission order of media source data and FEC data. Note though that instructions typically do not include time scheduling information, information of target/source addresses or ports or other session-specific information. This means that the container file and the compilation instructions therein is transparent to the particular session and can actually be used by a media server for multiple different sessions with different receiving clients but also by different media servers.

The compilation instructions could apply to a subset of the media source blocks and FEC reservoirs, implying that multiple such instructions have to be read and used by a media server during a session. Alternatively, a compilation instruction comprises all information required for a single media source file or indeed for all media source files in the container file.

More than one set of compilation instructions may actually be generated in step S33. In such a case, different alternative instructions could be provided, so that a media server has a choice of determining which particular instruction set to employ for a particular media session. For example, a first compilation instruction could be used for describing the transmission order of media source blocks and FEC data when employing a single transmission channel for the data transmission. A second instruction could be applied to the same media source blocks and FEC data but provides compilation and transmission order information if multiple channels are available, implying that data can be transmitted in parallel instead of sequentially. Thus, the several compilation instructions can be used to provide alternative transmission sessions intended for different transport channel conditions.

In a similar manner, alternative compilation instructions can be included for different reliability protection overheads. For example, a first compilation instruction is used for describing the compilation and transmission order of media source blocks and FEC data for a first maximum protection overhead level, whereas a second instruction is used for the same media source blocks but with a second different FEC overhead level. If this second FEC overhead level is higher (lower) than the first level, more FEC symbols or parity symbols as they are also denoted in the art can be added to a given amount of media source symbols.

In addition to the compilation instructions to be used by a media server, compilation instructions applicable to a repair server can be generated in step S33. These repair-dedicated instructions are then mainly employed by a post-session repair server for allowing identification of FEC redundancy data, possible dedicated post-session FEC redundancy data, to transmit to a requesting client that was not able to correctly receive and decode all media data received during a previous media session.

A next step S34 organizes the information, table and instructions provided and generated in the previous steps S30 to S33 and preferably step S21 of FIG. 3 in the container file. The container file will then contain the complete set of "raw" media data, FEC data and meta data required by a media server or repair server for identifying and composing data for transmission to requesting client(s). The method then ends.

FIG. 11 is a schematic overview of a media container file 1 according to the present invention. As has been described in the foregoing, the container file 1 contains media data of a number of media source files 10, 12, 14, M such files are illustrated in the figure, where $M \geq 1$. The media data of each file 10, 12, 14 is regarded as divided into a number of media source blocks 20, 22, 24. In the figure $Q_1$ such blocks 20, 22, 24 have been illustrated for the first media source file 10, where $Q_1 \geq 1$. Each such media source block 20, 22, 24 is in turn regarded as being partitioned into source symbols.

In addition to the media source blocks 20, 22, 24 with media data, the container file 1 comprises FEC reservoirs 30, 32, 34 containing pre-calculated FEC redundancy data to be used in connection with the media data for providing reliability protection. In a preferred implementation, each media source block comprises at least one dedicated FEC reservoir 30, 32, 34. In such a case, the number N of FEC reservoirs 30, 32, 34 in the figure is $$N \geq \sum_{i=1}^{M} Q_i.$$

In an alternative approach, each media source file 10, 12, 14 has at least one dedicated FEC reservoir, i.e. $N \geq M$. In such a case, respective departments or regions of the reservoirs 30, 32, 34 could be employed by the different media source blocks 20, 22, 24.

The association meta data 40 of the invention that provides an association between the FEC reservoir 30, 32, 34 and the media source block(s) 20, 22, 24 based on which the FEC data in the reservoir 30, 32, 34 are calculated is also provided in the container file 1. FIG. 11 illustrates multiple different possible locations of this meta data 40 in the file 1. In a first embodiment, the meta data is stored in connection with the associated media source block(s) 20, 22, 24. Thus, identification of a media source block 20, 22, 24 in the file also enables identification of the respective meta data 40 of that source block 20, 22, 24. Alternatively, or in addition, the meta data 40 is stored together with the respective FEC reservoirs 30, 32, 34. Thus, each reservoir 30, 32, 34 has a connected association meta data 40 that allows identification of the relevant media source block(s) 20, 22, 24 for which the particular reservoir 30, 32, 34 applies. If the container file 1 comprises a preferred file property table 60, the association meta data 40 could be provided therein. In such a case, a media server might only investigate the file property table 60 to identify the location of the relevant media data and FEC data to use during a media session. In a further possible implementation, the association meta data 40 is stored in connection with the different compilation instructions 50, 52, 54 of the container file 1, denoted hint tracks in the figure. In such a case, each hint track 50, 52, 54 need only contain the meta data 40 that is required for the media session implementable by the instructions in that hint track 50, 52, 54. A combination of multiple of these possible storage locations are also possible and within the scope of the present invention.

In an optional but preferred implementation of the invention, the container file 1 also comprises compilation instructions 70 dedicated for usage during a repair procedure, denoted repair hint track 70 in the figure. This hint track 70 then preferably comprises association meta data 45 useful for identification of a FEC reservoir 30, 32, 34 that comprises post-session FEC data that can be used in the repair procedure, which is described further herein.

According to a specific embodiment of the present invention, the media container file 1 is an interleaved unit, which is optimized for progressive download or streaming. Thereby, an entire multimedia presentation can be transmitted and downloaded by so-called progressive download or streaming to requesting clients.

The ISO base media file format [2, 3, 4] can advantageously be employed as file format for the media container file of the present invention. Alternative container file formats include, the MP4 file format, 3GP file format and QuickTime format.

Asynchronous Layered Coding (ALC) is a massively scalable reliable content delivery protocol. It is a base protocol for reliable multicast delivery of arbitrary binary objects and has been adopted as the mandatory protocol for broadcast/multicast file delivery in 3GPP2 BCMCS (Broadcast/Multicast Service) and Open Mobile Alliance (OMA) Browser and Content (BAC) Broadcast (BCAST) working group.

FLUTE (File Delivery over Unidirectional Transport) builds on top of ALC and defines a protocol for unidirectional delivery of files and has recently been adopted in 3GPP MBMS and DVB-H IP Data Casting (IPDC) as the mandatory protocol for broadcast/multicast file delivery. Both ALC and FLUTE are defined by the Internet Engineering Task Force (IETF).

FLUTE defines a File Delivery Table (FDT), which carries meta data associated with the files delivered in the ALC session, and provides mechanisms for in-band delivery and updates of FDT. In contrast, ALC relies on other means for out-of-band delivery of file metadata. OMA BCAST defines an Electronic Service Guide (ESG) that is normally delivered to clients well in advance of the ALC session. If the file metadata needs to be updated during the ALC session, then fragments of ESG can be updated by using the ESG delivery/update channels.

Files to be delivered over ALC or FLUTE can be stored as items in an ISO container file. The Meta box and its child boxes enable storing of a variety of data items, such as static media (pictures) and SMIL presentations, into an ISO base media file. They also allow associating file names and paths to items and signaling of the file directory structure in the ISO base media file.

Generally, the first step before files can be sent over ALC/FLUTE is to partition them into source blocks and source symbols. In addition, according to the present invention FEC encoded parity symbols are computed. The partitioning may depend on the FEC scheme, the target packet size, and the desired FEC overhead. For each source block to be FEC encoded, a reservoir of parity symbols are pre-computed and stored in the ISO base media file together with information on the FEC schema and partitioning of the source file.

The next step to facilitate transmission of files is to let the ISO base media file also contain instructions for a multicast/broadcast server that describe the ALC/FLUTE sessions (with Session Description Protocol) and how to encapsulate items into ALC or FLUTE packets.

The file partitioning and FEC reservoirs, on the one hand, and the hint tracks for delivery of files, on the other, can be used independently of each other. The former aids the design of hint tracks and allows alternative hint tracks, with, e.g., different FEC overheads, to re-use the same FEC symbols. They also provide means to access source symbols and additional FEC symbols independently for post-delivery repair, which may be performed over ALC/FLUTE or out-of-band via another protocol. In order to reduce complexity when a server follows hint track instructions, however, hint tracks refer directly to data ranges of items or data copied into hint samples.

In the following a more detail implementation example of a container file according to the invention in the form in the ISO base media file format and adapted for transmission over ALC/FLUTE is given. This should, however, merely be seen as an illustrative example of the present invention and obvious modifications and changes to this example are within the scope of the invention.

Storage of Source Files and FEC Reservoirs

Files intended for transmission over ALC/FLUTE are stored as items in a top-level Meta box ('meta') of an ISO base media file acting as a container file. The Item Location box ('iloc') specifies the actual storage location of each item (media source file) within the container file as well as the file size of each item. The file name, content type (MIME type), etc., of each item are provided by the Item Information box ('iinf').

In a similar manner, pre-computed FEC reservoirs are stored as additional items in the Meta box. If a source file is split into several source blocks, FEC reservoirs for each source block are preferably stored as separate items. The relationship between FEC reservoirs and original source items is recorded in the File Delivery (FD) Item Information box described in the following section.

FD Item Information Box

Details on the partitioning of source files and FEC reservoirs are provided in the FD Item Information box ('fiin'). The box is preferably used for files employing FD hint tracks and preferably exactly one is located in the Meta box ('meta'). It is defined as follows:

```
aligned(8) class FDItemInformationBox extends FullBox('fiin',
version = 0, 0)
{
    unsigned int(16) entry_count;
    PartitionEntry[ entry_count ] partition_entries;
    SessionGroupBox session_info;
    GroupIdToNameBox group_id_to_name;
}
```

Each PartitionEntry in the FD Item information box provides details on a particular file partitioning, FEC encoding, associated FEC reservoirs, and meta data for a particular media source file. It is possible to provide multiple entries for one source file if alternative FEC encoding schemes or partitionings are used in the ISO file. All partition entries can be implicitly numbered and the first entry typically has number 1.

Partition Entry

The Partition Entry ('paen') of a source is defined as follows:

```
aligned(8) class PartitionEntry extends Box('paen')
{
    FilePartitionBox blocks_and_symbols;
    FECReservoirBox FEC_symbol_locations;
}
```

It can contain two boxes that together provide all details on how a media source file is FEC encoded.

File Partition Box

The File Partition box ('fpar') identifies the source file and provides a partitioning of that file into source blocks and symbols. Definition:

```
aligned(8) class FilePartitionBox extends FullBox('fpar', version = 0, 0)
{
    unsigned int(16) item_ID;
    unsigned int(16) packet_payload_size;
    unsigned int(16) FEC_encoding_ID;
    unsigned int(16) FEC_instance_ID;
    usingned int(16) max_source_block_length;
    unsigned int(16) encoding_symbol_length;
    unsigned int(16) max_number_of_encoding_symbols;
    string scheme_specific_info;
    unsigned int(16) entry_count;
    for (i=1; i <= entry_count; i++)
    {
        unsigned int(16) block_count;
        unsigned int(32) block_size;
    }
}
```

Semantics:

item_ID indicates the item_ID of the source file. It is possible to provide alternative partitionings and/or FEC encodings of a source file by using the same item_ID in the File Partition box of more than one File Information entry.

packet_payload_size gives the target FLUTE or ALC packet payload size of the partitioning algorithm. Note that UDP packet payloads are larger, as they also contain FLUTE or ALC headers.

FEC_encoding_ID identifies the FEC encoding scheme. A zero value could correspond to a default scheme, such as to the "Compact No-Code FEC scheme" also known as "Null-FEC" [5]. A value of one preferably corresponds to the "MBMS FEC" [1].

FEC_instance_ID provides a more specific identification of the FEC encoder being used for an Under-Specified FEC scheme. This value is typically not used for Fully-Specified FEC schemes. See the document [5] for further details of Under-Specified FEC schemes.

max_source_block_length gives the maximum number of source symbols per media source block.

encoding_symbol_length gives the size (in bytes) of one encoding symbol (source symbol and FEC parity symbol). All encoding symbols of one item preferably have the same length, except the last symbol which may be shorter.

max_number_of_encoding_symbols gives the maximum number of encoding symbols that can be generated for a source block for FEC encoding ID 129 defined in the document [5].

scheme_specific_info is a base64-encoded null-terminated string of the scheme-specific object transfer information (FEC-OTI scheme specific info) in "FLUTEbis". The definition of the information depends on the FEC encoding ID.

entry_count gives the number of entries in the list of (block_count, block_size) pairs that provides a partitioning of the source file. Starting from the beginning of the file, each entry indicates how the next segment of the file is divided into source blocks and source symbols.

block_count indicates the number of consecutive source blocks of size block_size (in bytes). A block_size that is not a multiple of the symbol size (provided in the FEC Information Box) indicates that the last source symbol includes padding not stored in the file item.

FEC Reservoir Box

The FEC Reservoir box ('fecr') associates a media source file with FEC reservoirs stored as additional items:

```
aligned(8) class FECReservoirBox extends FullBox('fecr', version = 0, 0)
{
    unsigned int(16)  entry_count;
    for (i=1; i <= entry_count; i++)
    {
        unsigned int(16)  item_ID;
        unsigned int(32)  symbol_count;
    }
}
```

Semantics:

entry_count gives the number of entries in the list of (item_ID, symbol_count) pairs that provides the item_ID for each FEC reservoir and the number of source symbols it contains. The list starts with the FEC reservoir associated to the first source block of the media source file and continues sequentially through the file.

Item Info Box

In order to transmit internally embedded discrete media using broadcast/multicast file download protocol (ALC/FLUTE), it is preferred for the server to also transmit some meta data corresponding to the discrete media. The meta data is sent as part of the FDT, if FLUTE is used as a broadcast protocol, and as part of OMA BCAST ESG, if ALC is used in conjunction with OMA BCAST ESG.

As some of the Meta data information might be created on the fly, a template structure for the part of the meta data that is static and common to both FLUTE and ALC is defined as a second version of the item information entry. This version of the item information entry is used in the Item information box for items that have a source file partitioning.

```
aligned(8) class ItemInfoEntry extends FullBox('infe', version = 1, 0)
{
    unsigned int(16) item_ID;
    unsigned int(16) item_protection_index;
    unsigned int(32) content_length;
    unsigned int(32) transfer_length;
    string item_name;
    string content_type;
    string content_location;
    string content_encoding;
    string content_MD5;
    unsigned int(8) entry_count;
    for (i=1; i <= entry_count; i++)
    {
        unsigned int(32)  group_id;
    }
}
```

Semantics:
item_id contains either 0 for the primary resource (e.g. the Extensible Markup Language (XML) contained in an 'xml' box) or the ID of the item for which the following information is defined.
item_protection_index contains either 0 for an unprotected item, or the one-based index into the item protection box defining the protection applied to this item (the first box in the item protection box has the index 1).
content_length gives the total length (in bytes) of the (unencoded) file.
transfer_length gives the total length (in bytes) of the (encoded) file. Note that transfer length is equal to content length if no content encoding is applied (see below).
item_name is a null-terminated string in UTF-8 characters containing a symbolic name of the item, i.e. the filename of the item (source file);
content_type is a null-terminated string in UTF-8 characters with the MIME type of the item. If the item is content encoded (see below), then the MIME type refers to the item after content decoding.
content_location is a null-terminated string in UTF-8 characters containing the URI of the file as defined in HTTP/1.1 [6].
content_encoding is a null-terminated string in UTF-8 characters used to indicate that the binary file is encoded and needs to be decoded before interpreted. The values are as defined for Content-Encoding for HTTP/1.1. Some possible values are "gzip", "compress" and "deflate". An empty string indicates no content encoding. Note that the item is stored after the content encoding has been applied.
content_MD5 is a null-terminated string in UTF-8 characters containing an MD5 digest of the file [6, 7].
entry_count gives the number of entries in the following list.
group_ID indicates a file group to which the file item belongs.

All fields are preferably employed. However, it is possible that a null-terminated string only contains a null to indicate that the corresponding value of the field is not provided. Future extensions to the box may add additional fields at the end.

By considering the information provided in the File Information box for each item and the list of items used by a hint track, file entries needed for an FDT or an ESG can be constructed.

The content_location of embedded media resources may be referred by using the Universal Resource Location (URL) forms defined in Section 8.44.7 of the ISO base media file format [2, 3].

Session Group Box

An FD session can send simultaneously over several FD channels, each of which is described by an FD hint track. The Session group box contains a list of sessions as well as all media file groups and hint tracks that belong to each session. If there is more than one FD hint track in the container file, then one session group box is preferably present in the FD Item Information box.

Only one session group should be processed at any time. The first listed hint track in a session group specifies the base channel. If the media server has no preference between the session groups, the default choice is typically the first session group. The group IDs of all file groups containing the files referenced by the hint tracks is included in the list of file groups. The file group IDs can in turn be translated into file group names (using the Group ID To Name box) that can be included by the server in FDTs.

```
aligned(8) class SessionGroupBox extends Box('segr')
{
    unsigned int(16)  num_session_groups;
    for(i=0; i < num_session_groups; i++)
    {
        unsigned int(8) entry_count;
        for (j=0; j < entry_count; j++)
        {
            unsigned int(32)  group_ID;
        }
        unsigned int(16) num_channels_in_session_group;
        for(k=0; k < num_channels_in_session_group; k++)
        {
            unsigned int(32) hint_track_id;
        }
    }
}
```

Semantics:
num_session_groups specifies the number of session groups.
entry_count gives the number of entries in the following list comprising all file groups that the session group complies with. The session group contains all files included in the listed file groups as specified by the item information entry of each source file. The FDT for the session group should preferably only contain those groups that are listed in this structure.
group_ID indicates a file group that the session group complies with.

num_channels_in_session_groups specifies the number of channels in the session group. The value of num_channels_in_session_groups is a positive integer.

hint_track_ID specifies the track ID of the FD hint track belonging to a particular session group. One FD hint track corresponds to one Layered Coding Transport (LCT) channel.

Group ID to Name Box

The Group ID To Name box associates file group names to file group IDs used in the item information entries.

```
aligned(8) class GroupIdToNameBox extends FullBox('gitn',
version = 0, 0)
{
    unsigned int(32)  entry_count;
    for (i=1; i<=entry_count; i++)
    {
        unsigned int(32)  group_ID;
        string group_name;
    }
}
```

Semantics:

entry_count gives the number of entries in the following list.

group_ID indicates a file group.

group_name is a null-terminated string in UTF-8 characters containing the corresponding file group name.

Hint Track Format

The hint track structure is generalized to support hint samples in multiple data formats. The hint track sample contains any data needed to build the packet header of the correct type, and also contains a pointer to the media source block of data that belongs in the packet.

Sample Entry Format

FD hint tracks are hint tracks (media handler 'hint') with an entry-format in the sample description of 'fdp', short for File Delivery Protocol. The FDHintSampleEntry is contained in the SampleDescriptionBox ('stsd') and has the following syntax:

```
class FDHintSampleEntry( ) extends SampleEntry ('fdp ')
{
    uint(16) hinttrackversion = 1;
    uint(16) highestcompatibleversion = 1;
    uint(16) partition_entry_ID;
    uint(16) FEC_overhead;
    box additionaldata[ ];
}
```

Semantics:

partition_entry_ID indicates the partition entry in the FD item information box. A zero value indicates that no partition entry is associated with this sample entry, e.g. for FDT.

FEC_overhead is a fixed 8.8 value indicating the percentage protection overhead used by the hint sample(s). The intention of providing FEC_overhead is to provide characteristics to help a media server select a session group (and corresponding FD hint tracks).

The fields, "hinttrackversion" and "highestcompatibleversion" have the same interpretation as in the "RtpHintSampleEntry", described in section 10.2 of the ISO base media file format [2, 3]. As additional data a time_scale_entry box may be provided. If not provided, there is no indication given on timing of packets.

File entries needed for an FDT or an ESG can be created by observing all sample entries of a hint track and the corresponding File Metadata Information boxes of the items referenced by the above item_IDs. No sample entries shall be included in the hint track if they are not referenced by any sample.

It is recommended that the media server sends a different set of FEC symbols for each retransmission of the file.

Sample Format

Each FD sample in the hint track will generate one or more FD packets. Each sample contains two areas: the instructions to compose the packets, and any extra data needed when sending those packets (e.g. encoding symbols that are copied into the sample instead of residing in items for source files or FEC). Note that the size of the sample is known from the sample size table.

```
aligned(8) class FDsample extends Box('fdsa')
{
    FDPacketBox packetbox[ ]
    ExtraDataBox extradata;
}
```

Sample numbers of FD samples define the order they shall be processed by the media server. Likewise, FD Packet boxes in each FD sample appear in the order they shall be processed. If the Time Scale Entry box is present in the FD Hint Sample Entry, sample times are defined and provide relative send times of packets for a default bit rate. Depending on the actual transmission bit rate, a server may apply linear time scaling. Sample times may simplify the scheduling process, but it is up to the media server to send packets in a timely manner.

Packet Entry Format

Each packet in the FD sample has the following structure [8-10]:

```
aligned(8) class FDpacketBox extends Box('fdpa')
{
    header_template LCT_header_info;
    unsigned int(16) entrycount1;
    dataentry header_extension_constructors[entrycount1];
    unsigned int(16) entrycount2;
    dataentry packet_constructors[entrycount2];
}
```

LCT_header_info contains LCT header templates for the current FD packet.

entry_count1: count of following constructors.

header_extension_constructors: structures which are used to construct the LCT header extensions.

entry_count2: count of following constructors.

packet_constructors: structures which are used to construct the FEC payload ID and the source symbols in an FD packet.

LCT Header Template Format

```
class header_template
{
    unsigned int(1) sender_current_time_present;
    unsigned int(1) expected_residual_time_present;
    unsigned int(1) session_close_bit;
    unsigned int(1) object_close_bit;
    unsigned int(4) reserved;
    unsigned int(16) transport_object_identifier;
}
```

The LCT header template can be used by a media server to form an LCT header for a packet. Note that some parts of the header depend on the server policy and are not included in the template. Some field lengths also depend on the LCT header bits assigned by the server. The server may also need to change the value of the TOI.

LCT Header Extension Constructor Format

Note that a meida server can identify packets including FDT by observing whether EXT_FDT is present.

```
aligned(8) class LCTheaderextension
{
    unsigned int(8) header_extension_type;
    unsigned int(8) header_extension_length;
    unsigned int(8) header_extension_content[ ];
}
``` header_extension_length is expressed in multiples of 32 bit words. A zero value means that the header is generated by the server.

header_extension_content is the number of items equal to header_extension_length.

Packet Constructor Format

There are various forms of the constructor. Each constructor is 16 bytes in order to make iteration easier. The first byte is a union discriminator. This structure is based upon section 10.3.2 from the ISO base media file format [2, 3]. The packet constructors are used to include FEC payload ID as well as source symbols in an FD packet.

```
aligned(8) class FDconstructor(type)
{
    unsigned int(8)    constructor_type = type;
}
aligned(8) class FDnoopconstructor extends FDconstructor(0)
{
    unsigned int(8)    pad[15];
}
aligned(8) class FDimmediateconstructor extends FDconstructor(1)
{
    unsigned int(8) count;
    unsigned int(8) data[count];
    unsigned int(8) pad[14 − count];
}
aligned(8) class FDsampleconstructor extends FDconstructor(2)
{
    signed int(8) trackrefindex;
    unsigned int(16) length;
    unsigned int(32) samplenumber;
    unsigned int(32) sampleoffset;
    unsigned int(16) bytesperblock = 1;
    unsigned int(16) samplesperblock = 1;
}
aligned(8) class FDitemconstructor extends FDconstructor(3)
{
    unsigned int(16) item_ID;
    unsigned int(16) extent_index;
    unsigned int(64) data_offset;
    unsigned int(24) data_length;
}
aligned(8) class FDxmlboxconstructor extends FDconstructor(4)
{
    unsigned int(64)    data_offset;
    unsigned int(32)    data_length;
    unsigned int(24)    reserved;
}
```

Extra Data Box

Each sample of a FD hint track may include extra data stored in an Extra Data box:

```
aligned(8) class ExtraDataBox extends Box('extr')
{
    bit(8) extradata[ ];
}
```

FIG. 5 is a flow diagram illustrating a media session managing method according to the present invention. This media session management is conducted in a media server, such as streaming or downloading server, and uses the media container file of the present invention. The method starts in step S40, where a media container file is provided. This file provision can be realized by fetching the container file from a memory location of the media server, implying that the server previously has received the file from a content provider or creator. Alternatively, the media server can, in connection with a request for media data, order or receive the container file from a content provider.

In a next step S41, media data packets are compiled by extracting media data from media source block(s) of the container file and extracting FEC redundancy data from FEC reservoir(s). This data extraction is performed based on the meta data in the container file that provides an association between the media source block(s) and the FEC reservoir(s). Thus, media server preferably receives an identifier of the media data to transmit during the media session. Alternatively, the container file might only contain media data of a single media data file so no selection of media source is necessary. In either case, the previously described information included in the container file, such as in the file property table, can be used for identifying the start of the media file, i.e. the first media source block from which transmission should be started. Furthermore, further information included in the container file could be used as instructions of how media data and FEC data should be combined and included in data packets adapted for wireless transmission over a radio-based channel or multiple channels to different clients. The meta data of the invention allows, given the media source block from which media data is currently extracted, identification of the associated FEC reservoir from which FEC data should be extracted in the packet compilation step S41.

In a next step S42, the compiled media data packets with the FEC reliability protection are transmitted, preferably through broadcast or multicast techniques, to clients, where the media data can be rendered. The packet transmission is typically initiated once a transmit buffer in the media server has reached a given level. However, during the media session, new data packets are compiled and entered in the transmit buffer, while other packets are being transmitted, which is schematically illustrated by the line L2.

The generated container file and the organization of media data and the provision of pre-calculated FEC data therein, reduce the processing needs of the media server during a media session. This therefore leads to reduced server complexity and allows server flexibility as the server does not need to the source block construction and FEC encoding on the fly. In clear contrast, the server uses the meta data and instructions in the container file for extracting pre-computed source and FEC symbols, adds header information and sends the resulting data packets to clients.

The method then ends.

FIG. 6 is a flow diagram illustrating additional steps of the session managing method of FIG. 4. The method continues from step S40 of FIG. 5. In a next step S50 a FEC overhead capacity that can currently be employed for the transmission of data in the media session is determined. This capacity can be determined or at least estimated based on the bandwidth levels assignable to the server for the media transmission, minimum and maximum bit rate levels for the radio carrier(s) employed for this media transmission, etc. Actually any technique for determining such overhead capacity in connection with data transmission known in the art can be employed in this step S50.

Once the FEC overhead capacity has been determined, a next step S51 selects a compiling instruction set based on the determined overhead capacity. Thus, the media container file then contains multiple alternative sets of compiling instructions that can be used for a given media content but provides different levels of FEC overhead. In other words, these alternative compiling instructions basically define the amount of FEC redundancy data to add to the media data when compiling media data packets. The larger the acceptable FEC overhead, the more FEC data is added. By having different alternative compiling instructions, the media server can use those instructions that allow a highest allowable FEC protection given the current overhead limitations and thereby increases the chances of successful reception and decoding of the media data at different clients as compared to usage of a single compiling instruction set.

The method then continues to step S41 of FIG. 5, where media data packets are compiled from the media content data and the associated FEC data based on the compiling instructions selected in step S51.

Figure 12:
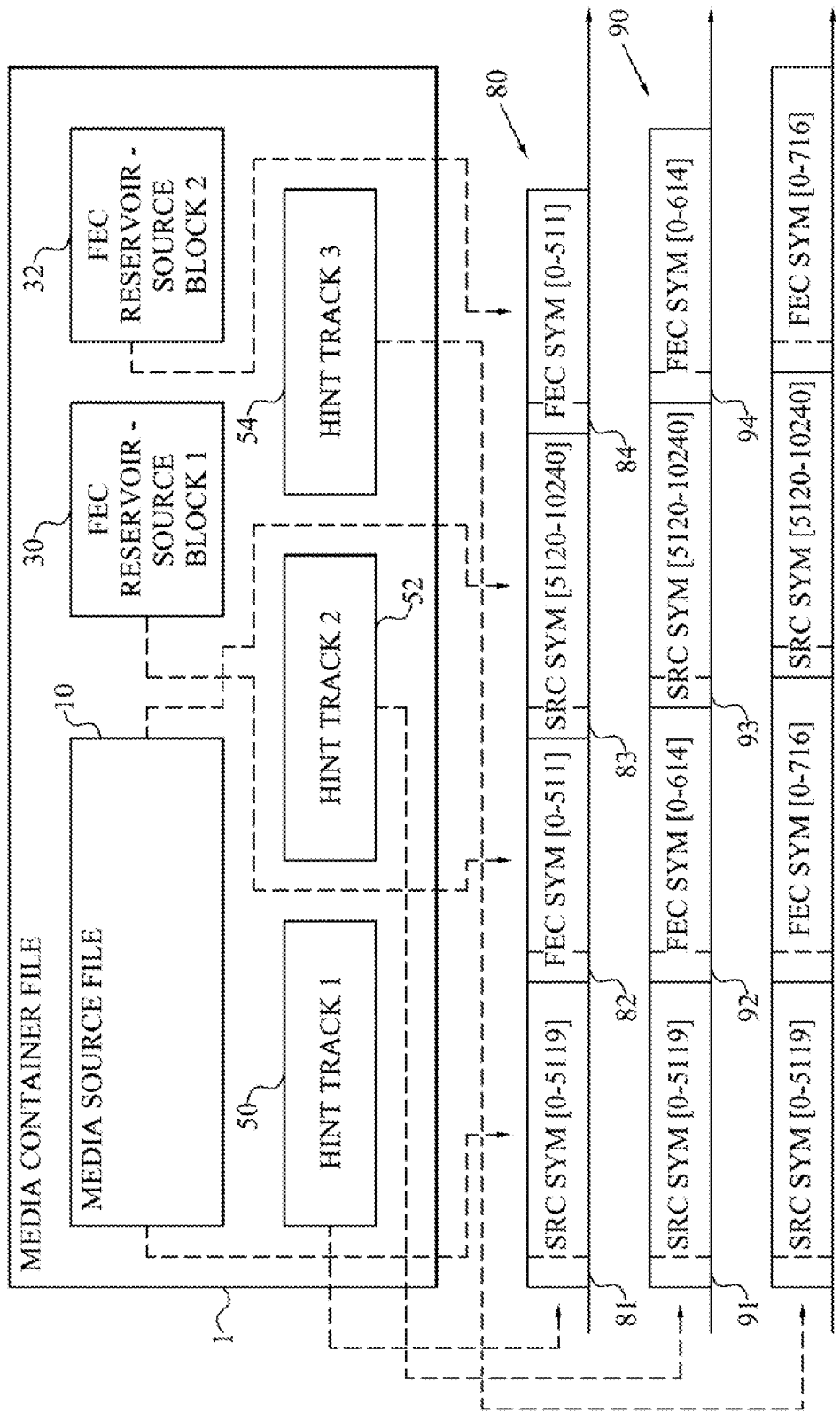
FIG. 12 is a schematic illustration showing compilation of different media streams employing a media container file according to the present invention.

FIG. 12 is a schematic illustration of a media container file 1 according to the invention that is used for showing the use of alternative compilation instructions according to an embodiment of the invention. The container file 1 comprises a media source file 10 preferably comprising multiple media source blocks, such as two media source blocks. In this embodiment, each media source block of the source file 10 has an associated FEC reservoir 30, 32 comprising FEC redundancy data pre-calculated for respective source block. The container file 1 also comprises, in this illustrative example, three hint tracks 50, 52, 54 containing compilation instructions for different FEC overheads. For example, the first hint track 50 could be used when a 10% redundancy overhead is desired, the second hint track 52 gives a FEC overhead of about 12% and the third hint track 54 gives a 14% FEC overhead. In the figure, the source block construction algorithm suggested in Annex B of the document [1] has been employed. If the first hint track 50 is selected, a first stream of data packets 81, 82, 83, 84 (only one data packet per media source block and FEC block has been indicated in the figure) is generated. However, if instead the second hint track 52 is used, a second stream of data packets 91, 92, 93, 94 is generated. Compared to the first stream 80, the second stream 90 comprises larger FEC blocks, i.e. more FEC redundancy data, per media source block. However, the respective source block contains the same amount of media data in the two streams 80, 90.

As has been described in the foregoing, the media container file can contain multiple media source files or files carrying different media content. FIG. 7 is a flow diagram illustrating an embodiment of the compiling and transmitting steps of FIG. 5 with such a multi-file solution. The method continues from step S40 of FIG. 5. In a next step S60, media data packets of a first media content file and first FEC reservoir are generated based on the meta data and compiling instructions dedicated to this particular media content. The result of the packet generation could be regarded as a stream of data packets containing media content of the first set and FEC data from the first FEC reservoir. This first set of data packets is then transmitted in step S61 to requesting clients using a radio-based communication channel, preferably a broadcast or multicast channel.

However, in the current media session also media content of a second media source file or set in the container file should be transmitted to the clients. As a consequence, data packets containing media content data from the second media source file and FEC redundancy data from a second associated FEC reservoir are generated based the meta data and compiling instructions associated with this content in step S62. The resulting data packets are then transmitted, in step S63, using the same radio-based communication channel that was employed by the server in the previously described step S61. Thus, the two data packet sets will be sent as a continuous stream of data packets.

FIG. 8 is a flow diagram illustrating an additional embodiment of the compiling and transmitting steps of FIG. 5 with a multi-file solution. The method continues from step S40 of FIG. 5. In a next step S70, media data packets are generated to contain media content data from a first media source file and FEC data from a first FEC reservoir. This step S70 basically corresponds to step S60 of FIG. 7 and is not described further herein. A next step S71 corresponds to step S61 of FIG. 6, where data packets containing media content derived from a second media source file and second FEC reservoir of the container file. In this embodiment, the media server can manage two client groups (IP multicast groups) simultaneously. Thus, in a next step S72, the media server transmits the first set or stream of data packets generated in step S70 to client members of the first media group using a first radio-based communication channel and simultaneously or at least partly simultaneously transmits the second media data packet stream to client members of a second media group using a second radio-based communication channel. The two data packet set will, thus, be sent as parallel media streams in this embodiment. The method then ends.

The present invention also encompasses the situation where media data of multiple media files are compiled and transmitted collectively to a group of clients. In such a case, the media data from the multiple source files are managed together by the media server during the media session. This is in particular the case where one media file contains video data and a second media file contains associated audio data. The media data of the two files can be transmitted using a same radio-base communication channel or different such channels.

It is anticipated by the present invention that the teachings described above in connection with FIGS. 7 and 8 can be extended to handle the case with more than two media source files and FEC reservoirs included in the container file.

Figure 13:
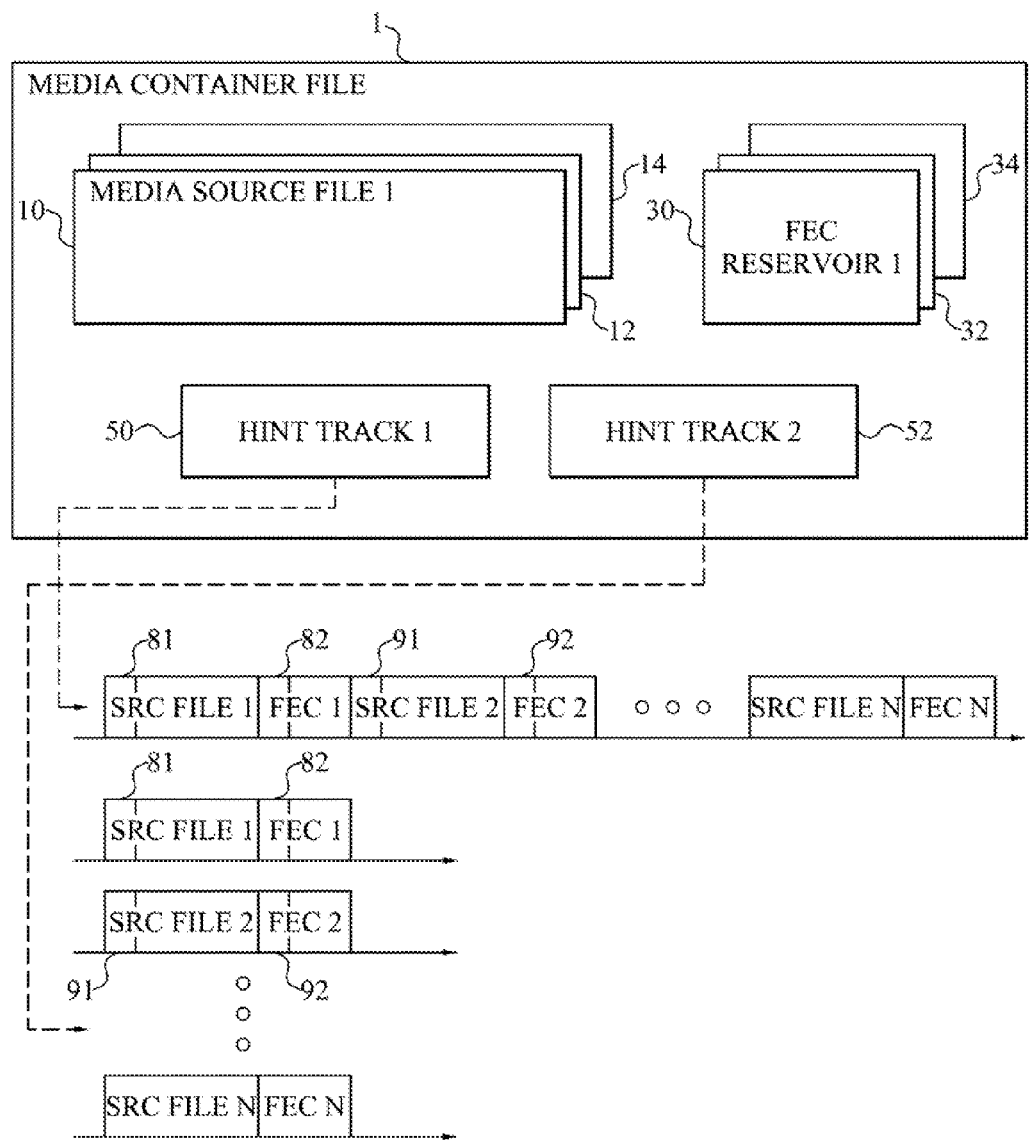
FIG. 13 is another schematic illustration showing compilation of different media streams employing a media container file according to the present invention.

FIG. 13 is a schematic representation of a media container file 1 having multiple media source files 10, 12, 14 and multiple FEC reservoirs 30, 32, 34. The container file 1 also comprises two hint tracks 50, 52 with compiling instructions and meta data required for extracting media content data from the source files 10, 12, 14 and FEC data from the reservoirs 30, 32, 34.

A first hint track 50 could be employed by a media server when composing a stream of data packets 81, 82, 91, 92 containing media data and FEC data from multiple source files 10, 12, 14 and FEC reservoirs 30, 32, 34. The generated stream will then be transmitted using a radio-based channel to requesting clients (compare with FIG. 7). The second hint track 52 could be employed when multiple media groups should be simultaneous managed. Thus, multiple parallel streams of data packets 81, 82; 91, 92 are generated by the media server based on the hint track 52, source files 10, 12, 14 and FEC reservoirs 30, 32, 34.

If the media container file also comprises additional information, such as information of file-to-block division, block partitioning, information of a FEC algorithm and/or file property table, the media server can use this additional information in the data packet generation and transmission.

For example, information of the block partitioning can be used by the media server together with the meta data for extracting media data from the media source files and blocks in the container file. The partitioning information helps, in this way, the server to correctly identify the correct storage location of desired media data in the container files. Correspondingly, FEC algorithm information can be useful by the media server together with the meta data in extracting media data and FEC data from the container file. Different FEC algorithms require different partitioning of media content into source symbols and blocks and in addition the partitioning could depend on the protection overhead. Thus, information of the FEC algorithm and other FEC parameters employed when pre-calculating the FEC data can be of usage to the media server.

The additional data and preferably information of MIME type, any coding information, size information, etc. useful by the media server can be included or at least announced in the file property table. In a preferred implementation, this property table constitutes a single information or look-up source that can be accessed by the media server for obtaining information required or advantageous in connection with media extraction, data packet compilation and transmission.

The media server of the invention could also be employed for post-repair proceedings. Thus, in such a case, after media content data and FEC data has been transmitted (multicast) to clients, it could be possible that some of the clients are not able, despite the inclusion of FEC redundancy data in the media stream, to correctly decode the received media symbols. FIG. 9 is a flow diagram illustrating additional steps defining such a post-repair procedure. This procedure is typically initiated once the media transmission during the media session has been ended or at least following transmission of some media data to the clients. The method therefore continues from step S42 of FIG. 5. In the next step S80, the media server receives a request for a post-session repair procedure originating from a client, which previously has been involved in a media session with the server. The repair request typically comprises an identifier of the incorrectly received media data. This identification could be the name of the particular media content and possible some information allowing the content server to in more detail identify the portion of the content that was not successfully received by the client. In a next step S81, the server uses this information for extracting FEC redundancy data from a FEC reservoir identified based on the information. In this extracting step S81, the server could, by default, extract a pre-defined number of FEC symbols that are transmitted to the requesting client in step S82, preferably using unicast-based data transmission. If the provided FEC symbols are not enough for successful decoding of the media content, the client could request more FEC symbols from the server. Alternatively, the client provides the server with information allowing the server to at least estimate the number of FEC symbols that would be required for successful decoding of the media content at the client. In such a case, the server preferably uses this information in the extracting step S81 and the extracted FEC symbols are transmitted to the client in step S82.

The media container file of the present invention can also be employed in a dedicated post-session repair procedure following its use in a media session. FIG. 10 is a flow diagram illustrating such a post-session repair method of the invention. The method starts in step S90, where a repair server receives a request for FEC redundancy data from a client that has previously be involved in a media session and received media data from a media server. The request received in step S90 includes an identifier allowing the repair server to identify a media container file. Thus, the server provides in a next step S91, the relevant media container file based on the request, typically the identifier in the request. This container file is typically a copy of the container file used by a media server in the previous media session and therefore comprises media source block(s) and FEC reservoir(s) containing media and FEC data, respectively, transmitted but not totally successfully received at the requesting client. The container file can be ordered or requested from a content provider/creator or actually from the media server conducting the previous media session.

The repair server uses the identifier in the repair request for extracting FEC redundancy data from the media container file in a step S92 based on meta data. In a preferred implementation, the identifier could be a name of the media source file containing the incorrectly received media content or some more detailed information, including identification of the particular media source block that contained the missing media data. The meta data in the container file is then used together with the identifier to identify at least one FEC reservoir in the container file, from which the FEC data should be extracted. As was described in connection with step S81 of FIG. 9, the repair server could be informed of an estimate of the amount of FEC data that would be required for successful data decoding. Alternatively, the repair server could extract and send a default number of FEC symbols and require the client to request more FEC data if these default number of symbols were not enough.

In a preferred implementation, the container file comprises post-session repair instructions 70, see FIG. 11. These instructions are then used by the repair server for compiling data packets containing FEC data extracted from a FEC reservoir 30, 32, 34. The meta data 45 used by the server in this extraction procedure, could be included or constitute a part of the compilation instructions 70, as illustrated in the figure. Alternatively, the meta data 45 could be provided in connection with the relevant media source file 10, 12, 14, the FEC reservoir 30, 32, 34 or in a file property table 60 included in the container file 1.

Figure 14:
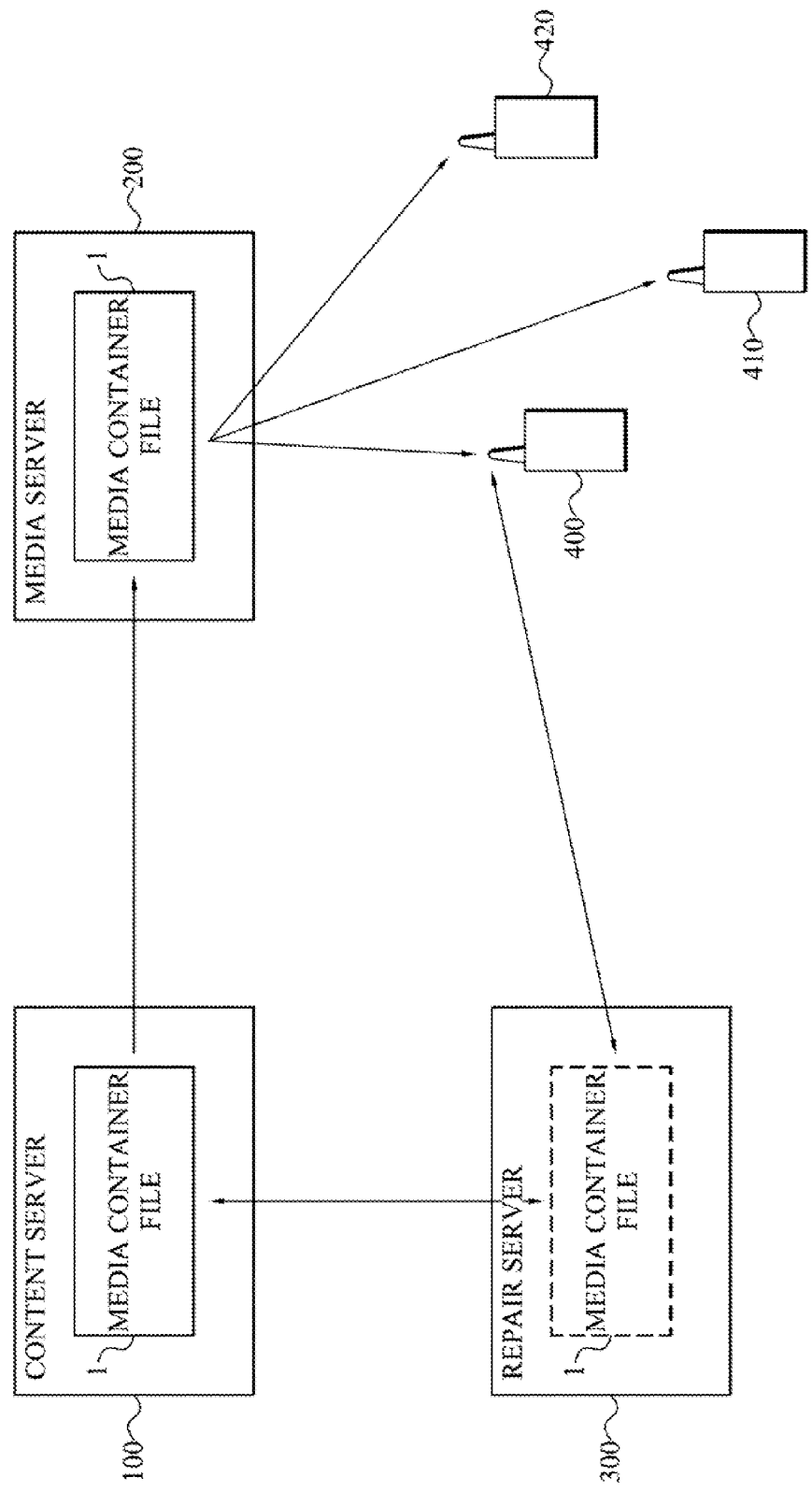
FIG. 14 is an overview of a communications network including servers managing a media container file according to the present invention.

FIG. 14 is a schematic overview of a communications network illustrating the parties generating or using the media container file 1 of the present invention. A content server 100 represents the content provider or creator that receives or has access to media source data and constructs a media container file 1. A copy of this container file 1 is sent to a media server 200 that uses the container file 1 in a media session for compiling data packets containing media and FEC data that is transmitted (multicast) to different clients 400, 410, 420 represented by mobile terminals in the figure. A repair server 300 can be contacted by one of the mobile terminals 400 following the media session with the media server 200. In such a case, the repair server 300 requests a copy of the media container file 1 from the content server 100 and uses it in a post-session repair procedure.

FIG. 15 is a schematic block diagram of a media content server 100 according to the present invention. The content server 100 comprises a general input and output (I/O) unit 110 arranged for and comprising functionality (transmitter/receiver, modulator/demodulator, encoder/decoder) for communicating with external units. This I/O unit 110 is in particular arranged for receiving input media content and for receiving requests for media container files. The I/O unit 110 is also employed by the server 100 when transmitting such container files to other servers in the communications network.

The content server 100 also comprises a container file creator 120 arranged for creating media container files of the invention. The creator 120 comprises a media block manager 130 arranged for entering and organizing at least one media source block into a media container file. This at least one input source block is preferably provided from a file divider 190 of the content server 100. Alternatively, the at least one source block could be retrieved from an internal data storage 115 and be provided, using the I/O unit 110, from external media sources 500, 510.

A FEC codec 160 of the content server 100 calculates FEC redundancy data for the media source blocks entered in the container file by the block manager 130. This FEC codec 160 could use any of the previously mentioned FEC algorithms in this calculation procedure. The codec 160 can be set to use a given FEC algorithm for all its redundancy data calculations. Alternatively, the codec 160 can have access to multiple different algorithms and therefore has a choice of actual algorithm. The algorithm selection could be performed based on different parameters, such as the particular block division made by the file divider 190, the type of date in the media source blocks or some other parameter. The FEC data calculated by the codec 160 could be employed both as redundancy data in a media session and as repair data in a post-session repair procedure.

The resulting calculated FEC data (symbols) are input to a FEC data manager 140 of the file creator 120. This FEC manager 140 organizes the input FEC data into at least one FEC reservoir in the media container file. In a preferred implementation, the FEC codec 160 and FEC manager 140 generates FEC symbols for each source block organized into the file by the block manager 130 and provides at least one FEC reservoir per source block in the container file.

A meta data manager 150 of the file manager 120 provides meta data into the container file. This meta data provides an association between the media source blocks organized by the block manager 130 and the FEC reservoirs organized by the FEC manager 140.

The resulting media container file can then be, at least temporary, stored in the data storage 115 or be transmitted by the I/O unit 110 to a media server or repair server.

In a preferred implementation, the input media content is in the form of a media source file that is provided to the file divider 190. This divider 190 splits the source file into one or more source blocks. The divider 190 could base this file division based on different information or parameters. For example, the file division could at least partly be determined based on the FEC algorithm employed by the FEC codec 160. In such a case, the file division 190 preferably has access to information of such FEC algorithm. The divider 190 could then split a media source file into N−1 equally sized media source blocks and one media source block that could have a smaller size than the other N−1 blocks.

The media file is also input to a block partitioner 195 operable on the media data preferably following the processing of the data by the file divider. This partitioner 195 operates on one media source block in time and partitions the block into source symbols of a defined size. This block partitioning is preferably based on the particular FEC algorithm or scheme to be employed by the FEC codec 160. The block partitioner 195 could also operate for performing the partitioning adapted to fit the source symbols into data packets that will be employed by a media server during a media session. Thus, packet size, such as UDP packet size, information could be employed by the partitioner 195.

The partitioner 195 also generates information of the resulting block partitioning. This information is then forwarded to the FEC codec 160 for usage when generating the FEC redundancy data.

The units 110, 120, 130, 140, 150, 160, 190 and 195 of the content server 100 may be implemented or provided as software, hardware or a combination thereof. The units 110 to 195 may all be implemented in the content server 100 in a single network node in a communications system. Alternatively, a distributed implementation is also possible and within the scope of the invention. In such a case, different units 110 to 195 of the content server 100 may be arranged in different network nodes but will despite this perform their intended operations as described in the foregoing.

FIG. 16 is a schematic block diagram illustrating an embodiment of the container file creator 120 of FIG. 15 in more detail. This file creator 120 also comprises an information manager 170 for including and organizing different information data in the container file. The manager 170 preferably provides information of the FEC algorithm used by the FEC codec 160, the file division used by the file divider 190 and/or block partitioning of the block partitioner 195 in the file. Other information could be data descriptive of the media data, such as media type, (block and/or symbol) size information, content name or identifiers, location information, optional coding information, etc. In a preferred embodiment, this information is organized, possibly together with the meta data from the meta manager 150, into a file property table included in the container file.

An instruction manager 180 of the file creator 120 generates and inserts compiling instructions into the container file. These instructions include information used by media servers for compiling, based on meta data from the meta data manager 150, media data from the media source blocks and FEC data from the FEC reservoirs. The manager 180 could generate a single instruction or set of instructions per media content in the file. Alternatively, different such instructions adapted for different FEC overheads, different FEC data types and/or different number of radio-based communications channel employed in the media session could be provided by the manager 180 and organized into the container file.

The units 130 to 180 of the container file creator 120 may be implemented or provided as software, hardware or a combination thereof. The units 130 to 180 may all be implemented in the container file creator 120. Alternatively, a distributed implementation is also possible and within the scope of the invention. In such a case, different units 120 to 180 of the container file creator 120 may be arranged elsewhere in the content server 100.

Figure 17:
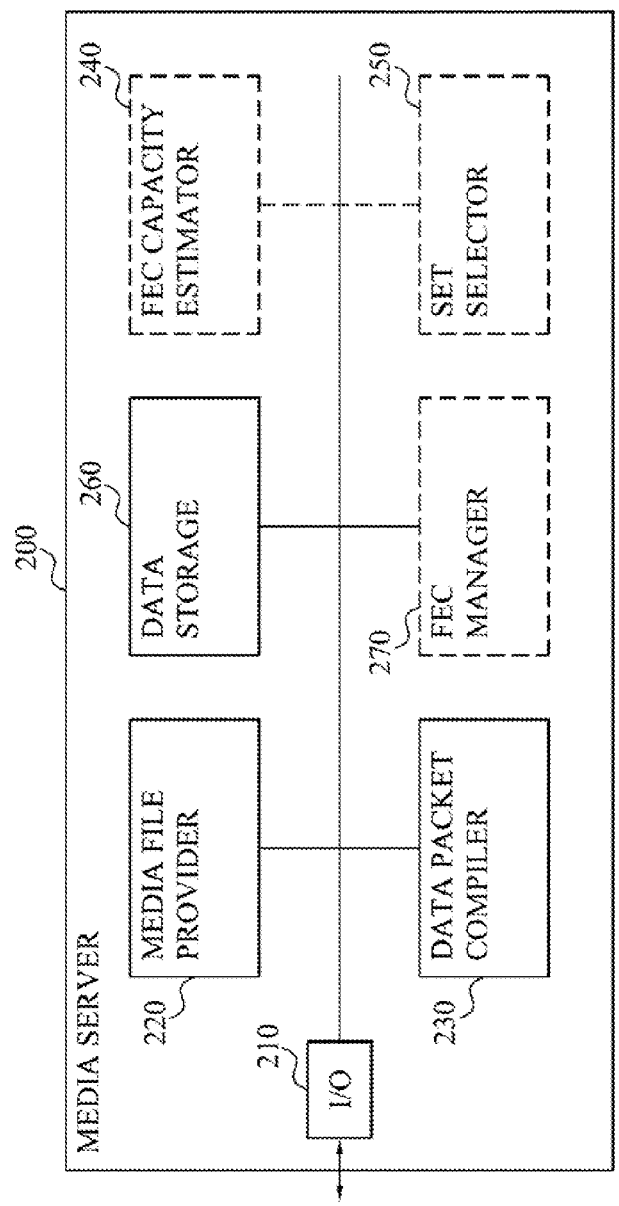
FIG. 17 is a schematic block diagram of a media session server according to yet a further aspect of the present invention.

FIG. 17 is a schematic block diagram of a media session server 200 according to the present invention. This media server 200 comprises an I/O unit 210 for conducting communication with external units. This I/O unit 210 is in particular arranged for requesting and receiving media file containers from a content server. The I/O unit 210 also receives request for media content originating from different user clients or at least information of to which clients media content should be transmitted. Data packets compiled by the media server 200 are also transmitted by the I/O unit 210 to these clients.

The server 200 comprises a media file provider 220 that provides a media content file to use in the current session. This file provider 220 may generate a request for a particular container file that is transmitted to a content creator by the I/O unit 210. Alternatively, the provider 220 fetches a previously received container file from a data storage 260 provided in the media server 200.

A data packet compiler 230 uses meta data and preferably compiling instructions included in the container file from the provider 220 to extract media data and FEC data from the file and generate data packets containing this extracted data. The so-generated data packets are then transmitted by (streamed or downloaded from) the I/O unit 210.

The data packet compiler 230 preferably also uses other information included in the file (FEC algorithm information, division/partitioning information, size information, content name, content storage information) in this compilation process. Thus, actually all instructions and data required for generating data packets with media data and FEC data are provided in the content file, which allows for a flexible and efficient media session management.

Different compiling instructions could be included in the file for a given media content. For example, the instructions could be channel-dependent or capacity-dependent. In the former case, the number of available radio-channels and the number of parallel media streams that should be transmitted determines the actual compiling instructions to use by the compiler 230. In the latter case, a FEC capacity estimator 240 is preferably included in the server 200 for estimating a maximum amount of FEC overhead that could be employed during the session. The overhead estimation performed by the estimator 240 is preferably dynamically updated during the session, as the overhead capacity could be changed through the session. A set selector 250 uses the capacity estimations from the estimator 240 for selecting which particular compilation instruction or instructions set of those available in the file to use. The packet compiler 230 then uses this instruction (set) for compiling media data and FEC data into data packets.

The media server 200 may optionally comprise a FEC manager 270 that can be used by the media server 200 in a post-session repair procedure. In such a case, the I/O unit 210 receives a repair request originating from a client, to which the server 200 previously has transmitted media and FEC data. This request is forwarded from the I/O unit 210 to the FEC manager 270. The manager 270 uses the request for identifying and extracting FEC redundancy data (symbols) from the media container file, e.g. as stored in the data storage 260. In this post-session FEC extraction, the FEC manager 270 could employ post-session repair instructions included in the container file for identifying the correct FEC data and/or for compiling the extracted FEC data into data packets. The resulting data packets are then transmitted to the requesting client by the I/O unit 210.

The units 210, 220, 230, 240, 250, and 270 of the media server 200 may be implemented or provided as software, hardware or a combination thereof. The units 210 to 270 may all be implemented in the media server 200 in a single network node in a communications system. Alternatively, a distributed implementation is also possible and within the scope of the invention. In such a case, different units 210 to 270 of the media server 200 may be arranged in different network nodes but will despite this perform their intended operations as described in the foregoing.

Figure 18:
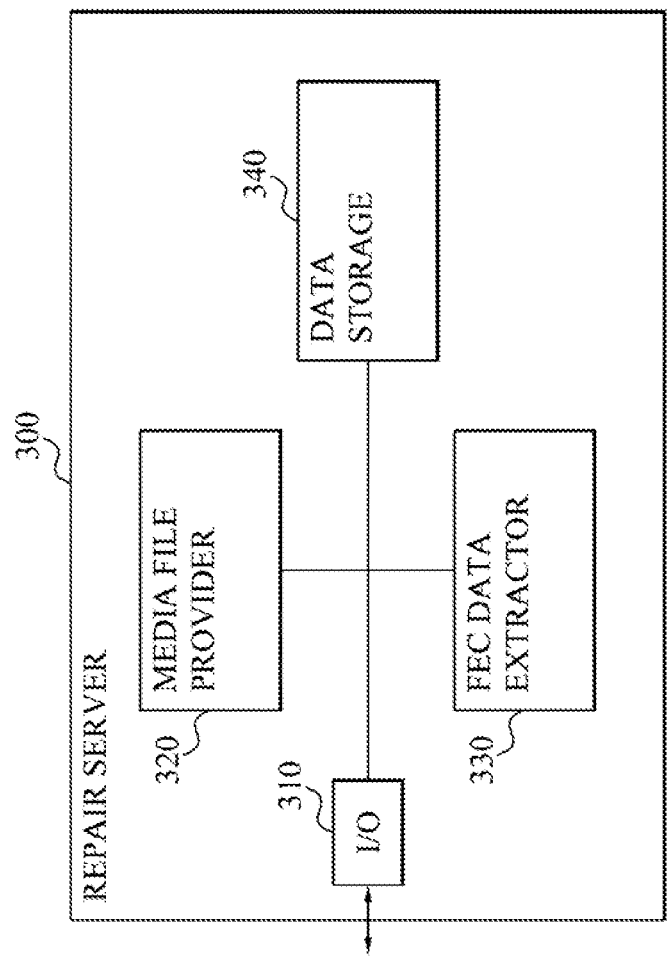
FIG. 18 is a schematic block diagram of a repair server according to still a further aspect of the present invention.

FIG. 18 is schematic block diagram of a repair server 300 according to the present invention. The server 300 includes an I/O unit 310 arranged for conducting communication with external units. This I/O unit 310 is in particular provided for receiving post-session repair requests from clients and for requesting media container files from a content creator or media session server. Transmission of data packets comprising FEC redundancy data is also performed by the I/O unit 310.

The repair server 300 comprises a media file provider 320 that provides a container file in response to reception of a repair request from a client. This provider 320 could compose a container request that is transmitted by the I/O unit 310 to a content creator to provide the file. Alternatively, the repair server 300 has previously received the container file so the file provider 320 fetches it from a data storage 340.

A FEC data extractor 330 is arranged in the server 300 for extracting FEC redundancy data from the container file provided by the file provider 320 based on an identifier included in the repair request. This identifier could be a name or other identifier of the media content that was not successfully received by the client. Other identifiers, such as identifier of the media session server and/or time of delivery of the media content could be used that allows the repair server 300, possibly by means of a request to the media server, to identify the correct media content. More detailed information, such as the particular portion of the media content (allows identification of the erroneously received media source block) could alternatively or in addition be employed.

The amount of FEC data extracted by the data extractor 330 could be pre-defined. If more FEC symbols than this pre-defined default level are required, the client must expressly notify the server 300 accordingly or the client needs to send a request for further FEC data. Alternatively, the extractor 330 receives an estimate from the client of how many FEC symbols that might be needed for successful decoding of all media content. The extractor 330 would then use this estimate in the FEC data extraction.

In a preferred implementation, the container file comprises post-session repair instructions that define compilation of FEC data from a FEC reservoir in the container file into data packets that can be sent to the client. In such a case, the extractor uses these instructions in the extraction and compilation process.

The units 310 to 330 of the repair server 300 may be implemented or provided as software, hardware or a combination thereof. The units 310 to 340 may all be implemented in the repair server 300 in a single network node in a communications system. Alternatively, a distributed implementation is also possible and within the scope of the invention. In such a case, different units 310 to 340 of the repair server 300 may be arranged in different network nodes but will despite this perform their intended operations as described in the foregoing.

It will be understood by a person skilled in the art that various modifications and changes may be made to the present invention without departure from the scope thereof, which is defined by the appended claims.

REFERENCES

[1] 3GPP TS 26.346 V7.0.0, 3rd Generation Partnership Project; Technical Specification Group Services and System Aspects; Multimedia Broadcast/Multicast Service (MBMS); Protocols and codecs, June 2006
[2] ISO/IEC 14496-12:2005: "ISO base media file format"
[3] ISO/IEC 15444-12:2005: "ISO base media file format"
[4] International application WO 2005/039131

[5] RFC 3695; Compact Forward Error Correction (FEC) Schemes, February 2004
[6] RFC 2616; Hypertext Transfer Protocol-HTTP/1.1, June 1999
[7] RFC 1864; The Content-MDS Header Field, October 1995
[8] RFC 3926; FLUTE-File Delivery over Unidirectional Transport, October 2004
[9] RFC 3450; Asynchrononous Layered Coding (ALC) Protocol Instantiation, December 2002
[10] RFC 3451; Layered Coding Transport (LCT) Building Block, December 2002

The invention claimed is:

1. A method of generating a media container file, said method comprising the steps of:
   organizing at least one media source block in said media container file;
   pre-calculating forward error correction, FEC, redundancy data based on said at least one media source block;
   organizing said FEC redundancy data in at least one FEC reservoir in said media container file; and
   providing, in said media container file, meta data providing an association between said at least one media source block and said at least one FEC reservoir.

2. The method according to claim 1, further comprising the steps of:
   providing a media source file; and dividing said media source file into said at least one media source block.

3. The method according to claim 2, wherein said dividing step comprises dividing said media source file into said at least one media source block based at least partly on a FEC algorithm used for calculating said FEC redundancy data.

4. The method according to claim 1, wherein said calculating step comprises the steps of:
   partitioning said at least one media source block into multiple media symbols based on a FEC algorithm to use for calculating said FEC redundancy data;
   generating partitioning information of said media source block partitioning; and
   calculating said FEC redundancy data based on said at least one media source block and said partitioning information.

5. The method according to claim 4, further comprising the step of:
   providing, in said media container file, information of said FEC algorithm and said partitioning information.

6. The method according to claim 1, further comprising the step of:
   providing, in said media container file, a property table comprising storage location information of said at least one media source block within said media container file.

7. The method according to claim 1, further comprising the steps of:
   generating compiling instructions defining compilation, based on said meta data, of media data from said at least one media source block and FEC redundancy data from said at least one FEC reservoir to form a media stream of data packets; and
   organizing said compiling instructions in said media container file.

8. The method according to claim 7, wherein said step of generating compiling instructions comprises the steps of:
   generating a first set of compiling instructions defining compilation, based on said meta data, of media data from said at least one media source block and FEC redundancy data from said at least one FEC reservoir to form a first media stream of data packets having a first level of FEC redundancy overhead; and
   generating a second set of compiling instructions defining compilation, based on said meta data, of media data from said at least one media source block and FEC redundancy data from said at least one FEC reservoir to form a second media stream of data packets having a second level of FEC redundancy overhead.

9. The method according to claim 1, wherein said FEC redundancy data is FEC redundancy data to be used during a media session, and said method further comprising the steps of:
   calculating, based on said at least one media source block, post-session FEC redundancy data useful at a post-session repair procedure;
   organizing said post-session FEC redundancy data in at least one FEC reservoir in said media container file; and
   providing, in said media container file, meta data enabling identification of said at least one FEC reservoir based on an identifier associated with said at least one media source block.

10. A media content server comprising:
    a media block manager arranged for organizing at least one media source block in a media container file;
    a forward error correction, FEC, codec arranged for pre-calculating FEC redundancy data based on said at least one media source block;
    a FEC data manager arranged connected to said FEC codec for organizing said FEC redundancy data in at least one FEC reservoir in said media container file; and
    a meta data manager arranged for providing, in said media container file, meta data providing an association between said at least one media source block and said at least one FEC reservoir.

11. The media content server according to claim 10, further comprising:
    a media source arranged for providing a media source file; and
    a file divider arranged connected to said media source for dividing said media source file into said at least one media source block.

12. The media content server according to claim 11, wherein said file divider is arranged for partitioning said media source file into said at least one media source block based at least partly on a FEC algorithm used by said FEC codec for calculating said FEC redundancy data.

13. The media content server according to claim 10, further comprising:
    a block partitioner for partitioning said at least one media source block into multiple media symbols based on a FEC algorithm to be used by said FEC codec and for generating partitioning information of said media source block partitioning, wherein said FEC, codec is arranged for calculating FEC redundancy data based on said at least one media source block and said partitioning information.

14. The media content server according to claim 13, further comprising:
    an information manager arranged for providing, in said media container file, information of said FEC algorithm used by said FEC codec and said partitioning information.

15. The media content server according to claim 10, further comprising:
    an information manager arranged for providing, in said media container file, a property table comprising storage location information of said at least one media source block within said media container file.

16. The media content server according to claim 10, further comprising:
an instruction manager arranged for i) generating compiling instructions defining compilation, based on said meta data provided by said meta data manager, of media data from said at least one media source block and FEC redundancy data from said at least one FEC reservoir to form a media stream of data packets and ii) organizing said compiling instructions in said media container file.

17. The media content server according to claim 16, wherein said instruction manager is arranged for i) generating a first set of compiling instructions defining compilation, based on said meta data provided by said meta data manager, of media data from said at least one media source block and FEC redundancy data from said at least one FEC reservoir to form a first media stream of data packets having a first level of FEC redundancy overhead, and ii) generating a second set of compiling instructions defining compilation, based on said meta data provided by said meta data manager, of media data from said at least one media source block and FEC redundancy data from said at least one FEC reservoir to form a second media stream of data packets having a second level of FEC redundancy overhead.

18. The media content server according to claim 10, wherein said FEC redundancy data generated by FEC codec is FEC redundancy data intended to be used during a media session, said FEC codec is arranged for calculating, based on said at least one media source block, post-session FEC redundancy data useful at a post-session repair procedure, said FEC data manager is arranged for organizing said post-session FEC redundancy data calculated by said FEC codec in at least one FEC reservoir in said media container file, and said meta data manager is arranged for providing, in said media container file, meta data enabling identification of said at least one FEC reservoir based on an identifier associated with said at least one media source block.

19. A media session managing method comprising the step of:
providing a media container file comprising at least one media source block, at least one forward error correction, FEC, reservoir comprising FEC redundancy data pre-generated based on said at least one media source block, and meta data providing an association between said at least one media source block and said FEC reservoir;
compiling data packets by extracting, based on said meta data, media data from said at least one media source block and FEC redundancy data from said at least one FEC reservoir; and
transmitting said data packets to at least one user terminal during a media session.

20. The method according to claim 19, wherein said media container file further comprises compiling instruction defining compilation of media data from said at least one media source block and FEC redundancy data from said at least one FEC reservoir to form a media stream of data packets, and said compiling step comprises compiling said data packets by extracting, based on said meta data and said compiling instructions, media data from said at least one media source block and FEC redundancy data from said at least one FEC reservoir.

21. The method according to claim 20, wherein said compiling instructions comprises multiple sets of compiling instructions, where each compiling instructions set is associated with a defined FEC redundancy overhead, said method comprising the steps of:
estimating a FEC redundancy overhead capacity for said media session; and
selecting a compiling instructions set from said multiple compiling instructions set based on said estimated FEC redundancy overhead capacity, wherein said compiling step comprises compiling said data packets by extracting, based on said meta data and said selected compiling instructions set, media data from said at least one media source block and FEC redundancy data from said at least one FEC reservoir.

22. The method according to claim 19, wherein said media container file further comprises a property table comprising storage information of said at least one media source block within said media container file, and said compiling step comprises compiling said data packets by extracting, based on said meta data and said property table, media data from said at least one media source block and FEC redundancy data from said at least one FEC reservoir.

23. The method according to claim 19, further comprising the steps of:
receiving a request for a post-session repair procedure originating from a user terminal of said at least one user terminal;
extracting FEC redundancy data from said at least one FEC reservoir based on said request; and
transmitting said extracted FEC redundancy data to said user terminal.

24. The method according to claim 23, wherein said media container file further comprising post-session repair instructions useful for identifying FEC redundancy data during a post-session repair session, and said extracting step comprises extracting FEC redundancy data from said at least one FEC reservoir based on said request and said post-session repair instructions.

25. A media session server comprising:
a media file provider for providing a media container file comprising at least one media source block, at least one forward error correction, FEC, reservoir comprising FEC redundancy data pre-generated based on said at least one media source block, and meta data providing an association between said at least one media source block and said FEC reservoir;
a data packet compiler arranged connected to said media file provider for compiling data packets by extracting, based on said meta data, media data from said at least one media source block and FEC redundancy data from said at least one FEC reservoir; and
a transmitter arranged connected to said data packet compiler for transmitting, to at least one user terminal during a media session, said data packets compiled by said data packet compiler.

26. The media session server according to claim 25, wherein said media container file further comprises compiling instruction defining compilation of media data from said at least one media source block and FEC redundancy data from said at least one FEC reservoir to form a media stream of data packets, and said data packet compiler is arranged for compiling said data packets by extracting, based on said meta data and said compiling instructions, media data from said at least one media source block and FEC redundancy data from said at least one FEC reservoir.

27. The media session server according to claim 26, wherein said compiling instructions comprises multiple sets of compiling instructions, where each compiling instructions set is associated with a defined FEC redundancy overhead, said media session server further comprises:
- a FEC capacity estimator arranged for estimating a FEC redundancy overhead capacity for said media session; and
- a set selector arranged connected to said FEC capacity estimator for selecting a compiling instructions set from said multiple compiling instructions sets based on said FEC redundancy overhead capacity estimated by said FEC capacity estimator, wherein said data packet compiler is arranged for compiling said data packets by extracting, based on said meta data and said compiling instructions set selected by said set selector, media data from said at least one media source block and FEC redundancy data from said at least one FEC reservoir.

28. The media session server according to claim 25, wherein said media container file further comprises a property table comprising storage information of said at least one media source block within said media container file, and said data packet compiler is arranged for compiling said data packets by extracting, based on said meta data and said property table, media data from said at least one media source block and FEC redundancy data from said at least one FEC reservoir.

29. The media session server according to claim 25, further comprising:
- a receiver arranged for receiving a request for a post-session repair procedure originating from a user terminal of said at least one user terminal; and
- a FEC manager arranged for extracting FEC redundancy data from said at least one FEC reservoir based on said request received by said receiver, wherein said transmitter is arranged connected to said FEC manager for transmitting said FEC redundancy data extracted by said FEC manager to said user terminal.

30. The media session server according to claim 29, wherein said media container file further comprising post-session repair instructions useful for identifying FEC redundancy data during a post-session repair session, and said FEC manager is arranged for extracting FEC redundancy data from said at least one FEC reservoir based on said request and said post-session repair instructions.

31. A post-session repair method comprising the steps of:
- receiving a request for forward error correction, FEC, redundancy data from a user terminal having previously received data packets comprising media data extracted from at least one media source block, said request comprises an identifier associated with said at least one media source block;
- providing, based on said request, a media container file comprising i) said at least one media source block, ii) at least one FEC reservoir comprising FEC redundancy data pre-generated based on said at least one media source block, and iii) meta data enabling identification of said at lest one FEC reservoir based on an identifier associated with said at least one media source block;
- extracting FEC redundancy data from said at least one FEC reservoir based on said received identifier; and transmitting said extracted FEC redundancy data to said user terminal.

32. The method according to claim 31, wherein said media container file further comprises post-session repair instructions defining compilation of FEC redundancy data from said at least one FEC reservoir to form at least one data packet of FEC redundancy data, - and said extracting step comprises extracting FEC redundancy data from said at least one FEC reservoir based on said received identifier and said post-session repair instructions.

33. A repair server comprising:
- a receiver for receiving a request for forward error correction, FEC, redundancy data from a user terminal having previously received data packets comprising media data extracted from at least one media source block, said request comprises an identifier associated with said at least one media source block;
- a container file provider arranged connected to said receiver for providing, based on said request received by said receiver, a media container file comprising i) said at least one media source block, ii) at least one FEC reservoir comprising FEC redundancy data pre-generated based on said at least one media source block, and iii) meta data enabling identification of said at least one FEC reservoir based on an identifier associated with said at least one media source block;
- a FEC data extractor arranged connected to said container file provider for extracting FEC redundancy data from said at least one FEC reservoir based on said received identifier; and
- a transmitter arranged connected to said FEC data extractor for transmitting said extracted FEC redundancy data to said user terminal.

34. The repair server according to claim 33, wherein said media container file further comprises post-session repair instructions defining compilation of FEC redundancy data from said at least one FEC reservoir to form at least one data packet of FEC redundancy data, and said FEC data extractor is arranged for extracting FEC redundancy data from said at least one FEC reservoir based on said received identifier and said post-session repair instructions.

\* \* \* \* \*

UNITED STATES PATENT AND TRADEMARK OFFICE
CERTIFICATE OF CORRECTION

| | | |
|---|---|---|
| PATENT NO. | : 8,225,164 B2 | Page 1 of 1 |
| APPLICATION NO. | : 12/160155 | |
| DATED | : July 17, 2012 | |
| INVENTOR(S) | : Westerlund et al. | |

It is certified that error appears in the above-identified patent and that said Letters Patent is hereby corrected as shown below:

On the Title Page, Item (56), under "OTHER PUBLICATIONS", Line 2, delete "Editon)" and insert -- Edition) --, therefor.

In Column 5, Line 49, delete "thereof" and insert -- thereof) --, therefor.

In Column 6, Line 15, delete "an" and insert -- and --, therefor.

In Column 13, Line 61, delete "usingned" and insert -- unsigned --, therefor.

In Column 15, Line 57, delete "file);" and insert -- file). --, therefor.

In Column 17, Line 43, delete "('fdp ')" and insert -- ('fdp') --, therefor.

In Column 19, Line 9, delete "meida" and insert -- media --, therefor.

In Column 29, Line 9, delete "Asynchrononous" and insert -- Asynchronous --, therefor.

In Column 30, Line 15, in Claim 9, delete "post- session" and insert -- post-session --, therefor.

In Column 33, Line 22, in Claim 28, delete ".packets" and insert -- packets --, therefor.

In Column 34, Line 6, in Claim 31, delete "lest" and insert -- least --, therefor.

In Column 34, Line 15, in Claim 32, delete "data, -" and insert -- data, --, therefor.

Signed and Sealed this
Second Day of October, 2012

David J. Kappos
*Director of the United States Patent and Trademark Office*